United States Patent
Rao

(10) Patent No.: US 10,764,162 B2
(45) Date of Patent: Sep. 1, 2020

(54) IN-FABRIC TRAFFIC ANALYSIS

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 285 days.

(21) Appl. No.: 14/668,813

(22) Filed: Mar. 25, 2015

(65) Prior Publication Data

US 2016/0285706 A1   Sep. 29, 2016

(51) Int. Cl.
*H04L 12/26* (2006.01)
*H04L 12/24* (2006.01)
*H04L 12/721* (2013.01)
*H04L 12/815* (2013.01)
*H04L 12/947* (2013.01)

(52) U.S. Cl.
CPC .......... *H04L 43/028* (2013.01); *H04L 41/12* (2013.01); *H04L 41/142* (2013.01); *H04L 43/022* (2013.01); *H04L 43/062* (2013.01); *H04L 45/38* (2013.01); *H04L 47/22* (2013.01); *H04L 49/25* (2013.01)

(58) Field of Classification Search
CPC ..... H04L 43/028; H04L 41/12; H04L 41/142; H04L 47/22; H04L 41/0806; H04L 47/10; H04L 43/022; H04L 45/38; H04L 47/2425

See application file for complete search history.

(56) References Cited

U.S. PATENT DOCUMENTS

| | | | | |
|---|---|---|---|---|
| 7,957,394 | B1* | 6/2011 | Cohen | H04L 41/0806 370/230.1 |
| 2004/0117613 | A1* | 6/2004 | Edmondson | H04L 47/10 713/150 |
| 2007/0271374 | A1* | 11/2007 | Shomura | H04L 43/022 709/224 |
| 2013/0128746 | A1* | 5/2013 | Yedavalli | H04L 45/38 370/238 |
| 2013/0258847 | A1* | 10/2013 | Zhang | H04L 47/22 370/232 |
| 2013/0294236 | A1* | 11/2013 | Beheshti-Zavareh | H04L 47/22 370/235 |
| 2014/0269288 | A1* | 9/2014 | Crisan | H04L 47/2425 370/231 |
| 2016/0020993 | A1* | 1/2016 | Wu | H04L 45/14 370/392 |

* cited by examiner

*Primary Examiner* — Vinncelas Louis
(74) *Attorney, Agent, or Firm* — Perkins Coie LLP

(57) ABSTRACT

An apparatus for a network includes: a processing unit having a filter generation module configured for: receiving an indication that a packet matches a user-defined filter; and creating one or more derivative filters based at least in part on the received indication, wherein a first derivative filter of the one or more derivative filters provides a finer grade of filtration compared to the user-defined filter; and a non-transitory medium configured for storing the one or more derivative filters.

38 Claims, 19 Drawing Sheets

Example

User specified filters: IP_src = 172.26.0.0/16, IP_dst = *

IP_src = IP_dst = 172.26.0.0/16

Inclusion Set: I = {172.16.1.0/24, 172.26.1.0/24, 172.26.2.0/24}
Exclusion Set: E = {172.26.1.2, 172.26.1.3}

V = {172.0.0.0/8}
F = {172.26.0.0/16}

T = (F ∩ I) - E
= {172.26.1.1, 172.26.1.4, 172.26.2.1, 172.26.2.2, 172.26.2.3}

| Snippet of Current Inventory for Visibility Domain ||
| Subnet | Target |
| --- | --- |
| 172.16.1.0/24 | 172.16.1.1 |
|  | 172.16.1.2 |
| 172.26.1.0/24 | 172.26.1.1 |
|  | 172.26.1.2 |
|  | 172.26.1.3 |
|  | 172.26.1.4 |
| 172.26.2.0/24 | 172.26.2.1 |
|  | 172.26.2.2 |
|  | 172.26.2.3 |
| 172.26.3.0/24 | 172.26.3.1 |
|  | 172.26.3.2 |
|  | 172.26.3.3 |
|  | 172.26.3.4 |
| 172.36.1.0/24 | 172.36.1.1 |
|  | 172.36.1.2 |

FIG. 9

Filter Tree Example

User specified high-level filters: IP_src = 172.26.0.0/16, IP_dst = Remote_Subnet
IP_src = Remote_Subnet, IP_src = 172.26.0.0/16

| Snippet of Current Inventory for Visibility Domain | |
|---|---|
| Subnet | Target |
| ... | ... |
| 172.16.1.0/24 | 172.16.1.1 |
|  | 172.16.1.2 |
| 172.26.1.0/24 | 172.26.1.1 |
|  | 172.26.1.2 |
|  | 172.26.1.3 |
|  | 172.26.1.4 |
| 172.26.2.0/24 | 172.26.2.1 |
|  | 172.26.2.2 |
|  | 172.26.2.3 |
| 172.26.3.0/24 | 172.26.3.1 |
|  | 172.26.3.2 |
|  | 172.26.3.3 |
|  | 172.26.3.4 |
| 172.36.1.0/24 | 172.36.1.1 |
|  | 172.36.1.2 |
| ... | ... |

FIG. 12

IN-FABRIC TRAFFIC ANALYSIS

FIELD

This application relates generally to network traffic monitoring, and more specifically, to systems and methods for network traffic monitoring.

BACKGROUND

In a traffic production network, packets are transmitted from one node to another node that is the intended recipient of the packets. In some cases, certain targets in the traffic production network may be monitored using a network monitoring system that is communicatively coupled to the traffic production network. The network monitoring system is configured to obtain packets from the traffic production network, and transmit them to one or more tools for analysis. Thus, the network monitoring system does not participate in the network traffic production.

In a network monitoring system, the fabric regulating the network components in the network monitoring system are mainly configured to provide delivery of network packets to tools. A target may be a host or a node in the traffic production network that is being monitored. A tool may be an appliance that is specialized for analyzing network packets. The fabric (visibility fabric) is made up of multiple nodes. The fabric provides a mechanism for directing specific slices of network traffic, associated with the targets, toward the desired tools. After the fabric provides delivery of network packets to the tools, the tools then analyze the packets to provide "visibility" of the network being monitored. Thus, the fabric is relegated to a supporting role in the overall traffic monitoring system. It should be noted that in such a system, network visibility is achieved only after the network traffic is delivered to the end tools and after the end tools analyze the network traffic. Accordingly, the tools are necessary components in such a network monitoring system, while the fabric plays a supportive role of feeding the tools with the right content. However, applicant of the subject disclosure determines that it may be desirable to provide network traffic analysis within the fabric so that network visibility may be achieved using the fabric.

SUMMARY

A filter generation method for a network includes: receiving an indication that a packet matches a user-defined filter; creating one or more derivative filters using an automatic filter generation module, wherein the one or more derivative filters are dynamically created by the automatic filter generation module based at least in part on the received indication, and wherein a first derivative filter of the one or more derivative filters provides a finer grade of filtration compared to the user-defined filter; and storing the one or more derivative filters in a non-transitory medium.

Optionally, a second derivative filter of the one or more derivative filters provides a finer grade of filtration compared to the first derivative filter.

Optionally, in addition to the first and second derivative filters, the one or more derivative filters may include one or more additional derivative filter(s). Thus, the depth of a filter tree may have any number of levels, depending on the topology of the network being studied and the kind of analyses (e.g., a desired level of visibility) a user is requesting.

Optionally, the one or more derivative filters comprise a plurality of derivative filters organized in a table.

Optionally, the one or more derivative filters comprise a plurality of derivative filters forming a filter tree.

Optionally, the filter tree comprises a topological representation of a subset of the network covered by the user-defined filter.

Optionally, the filter tree comprises a root node that is associated with the user-defined filter.

Optionally, the filter tree comprises a leaf node associated with an individual target being monitored.

Optionally, the method further includes deploying the one or more derivative filters to one or more service nodes.

Optionally, the automatic filter generation module is implemented in a SDN controller.

Optionally, the automatic filter generation module is configured to dynamically create the first derivative filter in response to the packet matching the user-defined filter.

Optionally, the one or more derivative filters comprise a second derivative filter.

Optionally, the indication comprises a truncated packet that is truncated from the packet matching the user-defined filter; and wherein the first derivative filter is dynamically created by the automatic filter generation module based on the truncated packet.

Optionally, the network comprises an auxiliary network configured to obtain packets from a traffic production network.

A method of providing network statistics using the one or more derivative filters generated by the filter generation method, includes: generating network statistics based on a packet matching the one or more derivative filters; and storing the network statistics in association with the one or more derivative filters.

Optionally, the act of generating the network statistics comprises updating a counter in response to the packet matching one of the one or more derivative filters.

Optionally, the one or more derivative filters further comprise a second derivative filter, the first derivative filter corresponding with a first component in the network, and the second derivative filter corresponding with a second component in the network; and wherein the act of generating the network statistics comprises updating first statistical information for the first component in response to the packet matching the first derivative filter, and updating second statistical information for the second component in response to the packet matching the second derivative filter, as the packet traverses through the first and second components in the network.

Optionally, the network statistics provide varying levels of visibility into a network traffic pattern associated with the user-defined filter.

Optionally, the network statistics are organized in a tree data-structure.

Optionally, the method of providing network statistics further includes providing a user interface for allowing a user to select a level of visibility into a network traffic pattern in relation to the user-defined filter.

Optionally, the one or more derivative filters comprise a second derivative filter, the second derivative filter providing a finer grade of filtration compared to the first derivative filter; wherein the network statistics comprise a first network statistics and a second network statistics; wherein the method further comprises providing a first network statistics associated with the first derivative filter if the user selects a first level of visibility as the selected level of visibility, or providing a second network statistics associated with the second derivative filter if the user selects a second level of visibility as the selected level of visibility.

An apparatus for a network includes: a processing unit having a filter generation module configured for: receiving an indication that a packet matches a user-defined filter; and creating one or more derivative filters based at least in part on the received indication, wherein a first derivative filter of the one or more derivative filters provides a finer grade of filtration compared to the user-defined filter; and a non-transitory medium configured for storing the one or more derivative filters.

Optionally, a second derivative filter of the one or more derivative filters provides a finer grade of filtration compared to the first derivative filter.

Optionally, the one or more derivative filters comprise a plurality of derivative filters organized in a table.

Optionally, the one or more derivative filters comprise a plurality of derivative filters forming a filter tree.

Optionally, the filter tree comprises a topological representation of a subset of the network covered by the user-defined filter.

Optionally, the filter tree comprises a root node that is associated with the user-defined filter.

Optionally, the filter tree comprises a leaf node associated with an individual target being monitored.

Optionally, the apparatus further includes an output port configured to output the one or more derivative filters for deployment to one or more service nodes.

Optionally, the processing unit is integrated with a SDN controller.

Optionally, the filter generation module is configured to dynamically create the first derivative filter in response to the packet matching the user-defined filter.

Optionally, the one or more derivative filters comprise a second derivative filter.

Optionally, the filter generation module is configured to receive a truncated packet as the indication, the truncated packet being truncated from the packet matching the user-defined filter; wherein the filter generation module is configured to dynamically create the first derivative filter based on the truncated packet.

Optionally, the network comprises an auxiliary network configured to obtain packets from a traffic production network.

A system for providing network statistics using the one or more derivative filters generated by the apparatus, includes: a database for storing network statistics in association with the one or more derivative filters, wherein the network statistics are based on a packet matching the one or more derivative filters.

Optionally, the database comprises a counter that is updated in response to the packet matching one of the one or more derivative filters.

Optionally, the one or more derivative filters further comprise a second derivative filter, the first derivative filter corresponding with a first component in the network, and the second derivative filter corresponding with a second component in the network; and wherein the database is configured to update first statistical information for the first component in response to the packet matching the first derivative filter, and to update second statistical information for the second component in response to the packet matching the second derivative filter, as the packet traverses through the first and second components in the network.

Optionally, the network statistics provide varying levels of visibility into a network traffic pattern associated with the user-defined filter.

Optionally, the network statistics are organized in a tree data-structure.

Optionally, the system further includes a user interface configured for allowing a user to select a level of visibility into a network traffic pattern in relation to the user-defined filter.

Optionally, the one or more derivative filters comprise a second derivative filter, the second derivative filter providing a finer grade of filtration compared to the first derivative filter; wherein the network statistics comprise a first network statistics and a second network statistics; wherein the user interface is configured to provide the first network statistics associated with the first derivative filter if the user selects a first level of visibility as the selected level of visibility, or to provide the second network statistics associated with the second derivative filter if the user selects a second level of visibility as the selected level of visibility.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

FIG. 9 illustrates an example of automatic target selection;

FIG. 12 illustrates an example of a filter tree;

DESCRIPTION OF THE EMBODIMENTS

Figure 1:
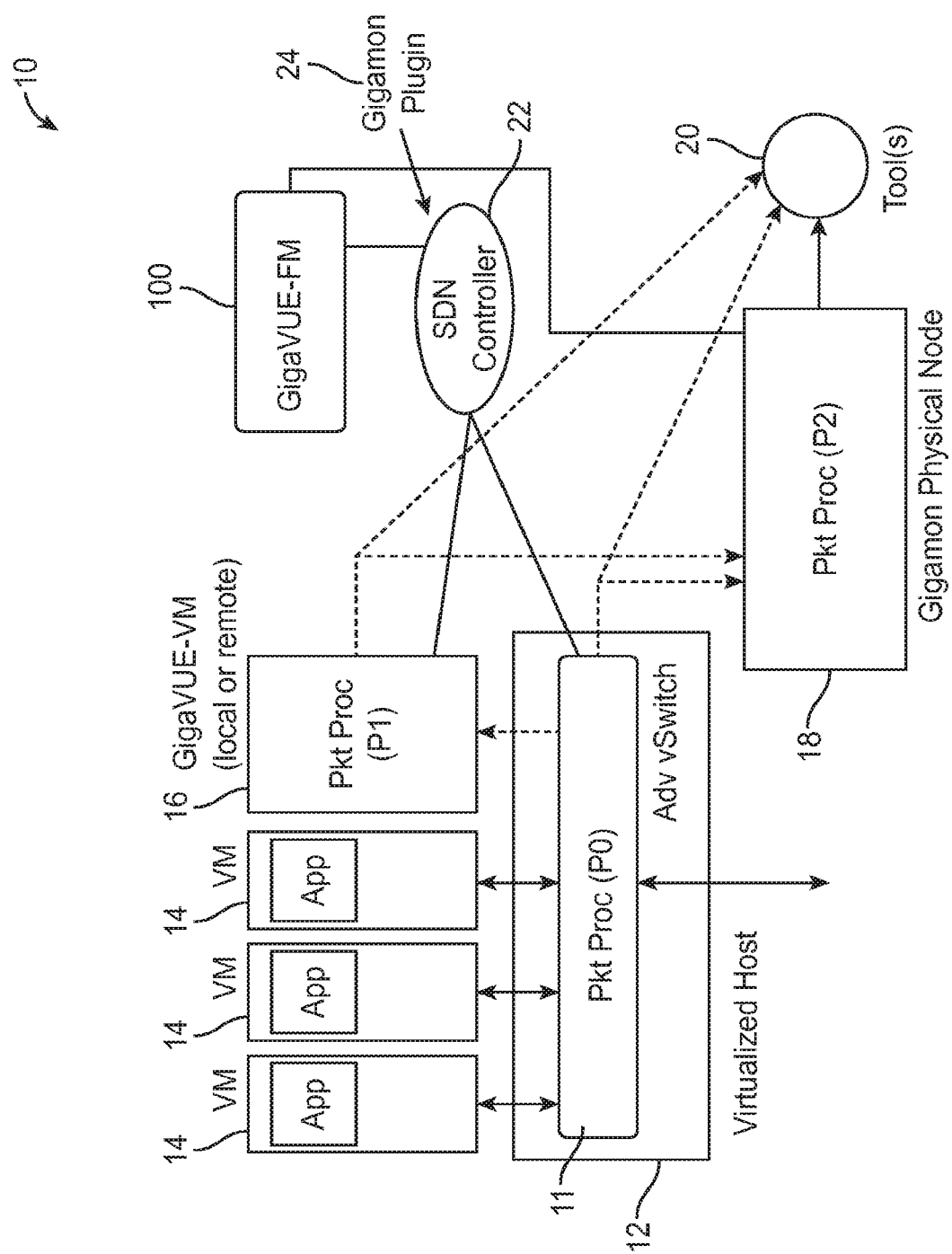
FIG. 1 illustrates a network in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

In the following description, these three aspects will be described in detail: (I) software defined visibility fabric, (II) automatic target selection, and (III) in-fabric traffic analysis.

(I) Software Defined Visibility Fabric

General Description of Software Defined Visibility Fabric

Embodiments described herein are directed to a new kind of auxiliary network called the Software Defined Visibility Fabric that is flexible, efficient and intelligent. The auxiliary network obtains packets from a traffic production network in an out-of-band configuration, and passes the packets to one or more tools, where the packets are analyzed for network traffic monitoring.

The Software Defined Visibility Fabric is a policy driven overlay network of chained service nodes. Each service node represents a packet processing station (e.g., network component) that can filter, manipulate and dispatch network packets. The overlay network is built by linking these nodes together using IP tunnels (GRE, VxLAN, etc.). Different kinds of service nodes, each offering varying levels of capability, may exist within the fabric as shown below:

| P0 Node | Host-level (advanced) virtual switch |
| P1 Node | Virtual monitoring appliance |
| P2 Node | Physical monitoring appliance |

P0 nodes straddle the boundary between the production network (where normal VM traffic is flowing) and the Software Defined Visibility Fabric. Their use helps eliminate unwanted traffic closer to the VMs being monitored, thereby freeing up precious bandwidth and reducing processing cycles consumed by other fabric nodes. The P1 nodes can aggregate traffic originating from several P0 and P1 nodes. Similarly, P2 nodes can aggregate traffic from several P0, P1 and P2 nodes.

The P0 service node provides the lowest degree of packet filtering, packet manipulating, and packet forwarding services. The P1 service node provides an intermediate degree of packet filtering, packet manipulating, and packet forwarding services. The P2 service node provides the highest degree of packet filtering, packet manipulating, and packet forwarding services. Accordingly, the P2 service node has higher packet processing intelligence than P1 service node, and the P1 service node has higher packet processing intelligence than P0 service node. On the other hand, the P0 node has higher packet processing efficiency than P1 node, and the P1 node has higher packet processing efficiency than P2 node.

Software Defined Networking (SDN) principles are employed for managing the service nodes P0, P1, P2. In particular, a fabric manager is provided, which operates based on SDN principles. The fabric manager is where all control and policy decisions are made, and is responsible for defining the behavior and roles of all P0, P1 and P2 nodes (that constitute the distributed data plane). The fabric manager is also configured to create a service chain that connects two or more of the service nodes in the auxiliary network. The service chain dictates the service nodes in the auxiliary network, and an order of the service nodes, packets are to traverse before reaching one or more tool(s) for network monitoring. During use, traffic from a monitored VM will flow through one or more service nodes in the auxiliary network to reach desired tool(s) according to a service chain determined by the fabric manager. The use of overlay networks allows the auxiliary network (the visibility fabric) to be deployed on top of existing physical and virtual networks, while maintaining full isolation from the traffic production network.

In some embodiments, the fabric manager's policy engine attempts to create the shortest possible (most efficient) service chain. The more expensive service nodes that provide higher packet processing intelligence (e.g., P2 nodes) are included only when the added benefits provided by them are required. In this way the fabric manager is constantly trying to balance efficiency versus intelligence.

Since the fabric manager provides a centralized policy decision, the individual service nodes can be utilized more efficiently within the overall Software Defined Visibility Fabric. Also, the Software Defined Visibility Fabric offers several advantages, including flexibility, efficiency, scalability, and intelligence.

Flexibility: The fabric manager can modify and/or scale a service chain as needed. For example, the fabric manager can add redundant P1 node(s) and/or P2 node(s) between targets being monitored (e.g., VMs, vNIC, etc.) and tool(s). Also, new P1 service nodes can be instantiated by the fabric manager on demand to provide additional processing capability. In addition, use of overlay networks allows P1 nodes to be relocated from one virtualized server to another.

Efficiency: Since any type of service node can forward traffic to a tool, the fabric manager can shorten the service chains, by eliminating P1 and/or P2 nodes, in certain cases based on a balance between efficiency and intelligence. For example, in some situations, the more advance packet processing intelligence provided by the P1 node and the P2 node may not be needed. In such cases, the service chain may not include P1 and/or P2 nodes.

Scalability: Several scale-out configurations are possible by employing multiple P1 and P2 nodes and dividing up the filtering, manipulating and forwarding tasks among them.

Intelligence: When more intelligence is necessary, nodes with high packet processing intelligence (e.g., P2 nodes) can be used in the chain. These nodes typically provide more advanced capability as compared to the P1 nodes and the P0 nodes.

Detailed Description of Software Defined Visibility Fabric

A major task in virtual machine (VM) traffic monitoring involves capturing packets entering and/or leaving VMs and delivering them to appropriate tools for analysis. In a virtualized environment, where multiple VMs may be conversing with each other and with external end-points, the challenge is to provide each tool with just the right selection of network traffic needed to perform its task. One way to achieve this, without adversely affecting VM traffic patterns, is to mirror packets associated with certain VMs to an out-of-band network where they can be processed and eventually forwarded to the respective tools. In accordance with some embodiments, a new kind of auxiliary network is provided for this purpose that is flexible, efficient, and intelligent. This auxiliary network (called "Software Defined Visibility Fabric") is a policy driven network of chained service nodes. Each service node represents a packet processing station that can filter, manipulate and dispatch network packets. The auxiliary network is built by linking these service nodes together, e.g., using IP tunnels such as GRE, VxLAN, etc., to create a chain of service nodes.

FIG. 1 illustrates a network 10 in accordance with some embodiments. The network 10 is an auxiliary network that is configured to obtain packets from a traffic production network, and to pass the packets to one or more tools for network monitoring. As shown in the figure, the auxiliary network 10 includes a virtual switch 11 implemented in a host 12, and a virtual machine (VM) 16 supported by the host 12. In the illustrated example, the host 12 that implements the virtual switch 11 is also the same host that supports the VM 16. In other examples, there may be one host 12 implementing the virtual switch 11, and another host 12 supporting the VM 16. As shown in the figure, the host 12 also supports multiple virtual machines VMs 14, but the VMs 14 are not a part of the auxiliary network. The network 10 also includes a physical network device 18 communicatively coupled to the host 12 and/or the VM 16. The network device 18 is configured to communicate with one or more tools 20. In some cases, each tool 20 may be a network monitoring tool configured to analyze packets for network monitoring. In other cases, each tool 20 may be any of other types of packet processing tools. The VMs 14 may be configured to run different applications to process packets and/or to perform other types of tasks. The VM 16 is configured to perform packet processing to pass packets downstream for analysis by the tool(s) 20. As shown in the figure, a Software Defined Networking (SDN) controller 22 may be configured to control the behavior of the virtual switch 11 and the VM 16.

The VM 16 and the network device 18 are parts of an auxiliary network configured to obtain packets from a production network, and to pass the packets to the tool(s) 20 for analysis. Thus, the VM 16 and the network device 18 are not parts of the production network. The virtual switch 11 is special because it can straddle the boundary between the production network and the auxiliary network. Thus, it is a part of the production network. If the virtual switch is used as a P0 node by the visibility fabric, then it is also a part of the auxiliary network. Not all virtual switches may be used as a P0 node. However, those that meet certain criteria of a visibility fabric service node (e.g., those that are capable of filtering, manipulation, and forwarding packets) can be used as a P0 node.

In the illustrated embodiments, the virtual switch 11, the VM 16, and the network device 18 are respective service nodes P0, P1, P2, each offering varying levels of capability, as follow:

| | |
|---|---|
| P0 Node | Host-level (advanced) virtual switch 11 (lowest capability) |
| P1 Node | Virtual monitoring appliance 16 (intermediate capability) |
| P2 Node | Physical monitoring appliance 18 (highest capability) |

In particular, each service node is capable of providing some degree of packet filtering, packet manipulating, and packet forwarding services. The P0 service node provides the lowest degree of packet filtering, packet manipulating, and packet forwarding services. The P1 service node provides an intermediate degree of packet filtering, packet manipulating, and packet forwarding services. The P2 service node provides the highest degree of packet filtering, packet manipulating, and packet forwarding services. Accordingly, the P2 service node has higher packet processing intelligence than P1 service node, and the P1 service node has higher packet processing intelligence than P0 service node. On the other hand, the P0 node has higher packet processing efficiency than P1 node, and the P1 node has higher packet processing efficiency than P2 node.

The P0 nodes straddle the boundary between a production network (where normal network traffic, such as VM traffic, is flowing) and the auxiliary network (Software Defined Visibility Fabric). Their use helps eliminate unwanted traffic closer to the VMs being monitored, thereby freeing up precious bandwidth and reducing processing cycles consumed by other nodes. The P1 nodes may aggregate traffic originating from several P0 and P1 nodes, and offer some advanced packet manipulation capabilities. Similarly, P2 nodes may aggregate traffic from several P0, P1 and P2 nodes and provide the highest levels of capacity, performance and packet manipulation capabilities.

The network device 18 is configured to receive packets, and pass the packets to one or more tools 20. In some cases, the network device 18 may be configured to receive normal packets (e.g., packets not from a virtualized network), as well as virtualized packets (e.g., packets with tunnel format that includes encapsulation of the original packets resulted from virtualization technology). In other cases, the network device 18 may be configured to receive only virtualized packets. Also, in some cases, the network device 18 may be any switch module that provides packet transmission in accordance with a pre-determined transmission scheme. In some embodiments, the network device 18 may be user-configurable such that packets may be transmitted in a one-to-one configuration (i.e., from one network port to an instrument port). As used in this specification, the term "instrument port" refers to any port that is configured to transmit packets to a tool (e.g., tool 20), wherein the tool may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the tool may be a pass-through device (i.e., it can receive packets, and transmit the packets back to the device 100 after the packets have been processed), such as an intrusion prevention system. In other embodiments, the network device 18 may be configured such that the packets may be transmitted in a one-to-many configuration (i.e., from one network port to multiple instrument ports). In other embodiments, the network device 18 may be configured such that the packets may be transmitted in a many-to-many configuration (i.e., from multiple network ports to multiple instrument ports). In further embodiments, the network device 18 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the network device 18 so that the packets (or certain types of packets) are routed according to any one of these configurations. Also, in some embodiments, the network device 18 may be an "out-of-band" network device, which is configured to obtain packets and pass them to a tool or to a network that is different from that associated with the original intended destination of the packets. Thus, the network device 18 is not a part of the underlying network that performs packet production.

As shown in the figure, a fabric manager 100 is provided. As will be described in further detail below, the fabric manager 100 is configured to create one or more service chains that connect service nodes (e.g., P0 node(s), P1 node(s), P2 node(s), etc.). Each service chain dictates the network components (as represented by the service nodes), and an order of the network components, the packets are to traverse in the auxiliary network before reaching one or more tool(s) for network monitoring. The fabric manager 100 is configured to communicate with the SDN controller 22 and the network device 18. In some cases, the fabric manager 100 may integrate with the SDN controller 22 through a plug-in 24. For example, in some cases, in a SDN enabled datacenter supporting virtualized workloads, the host-level virtual switches 11 may be under the control of the SDN controller 22. Since these switches 11 serve as service nodes in the SDN fabric, the fabric manager 100 may be integrated with the SDN controller 22 using the plug-in 24. The upper-half of the plug-in 24 may export an API that is specifically designed to satisfy the needs of the fabric manager 100. The lower-half of the plug-in 24 may be controller specific (e.g., different lower-halves of the plug-in 24 may be implemented for different controllers). In such an environment, it is possible for the fabric manager 100 to also manage the VMs 16 and the network devices 18 using the SDN controller 22, provided they are compatible with the controller's 22 Control-Data-Plane-Interface. If not, the fabric manager 100 may directly manage the VMs 16 and the network devices 18. In other cases, the plug-in 24 may not be needed.

Figure 2:
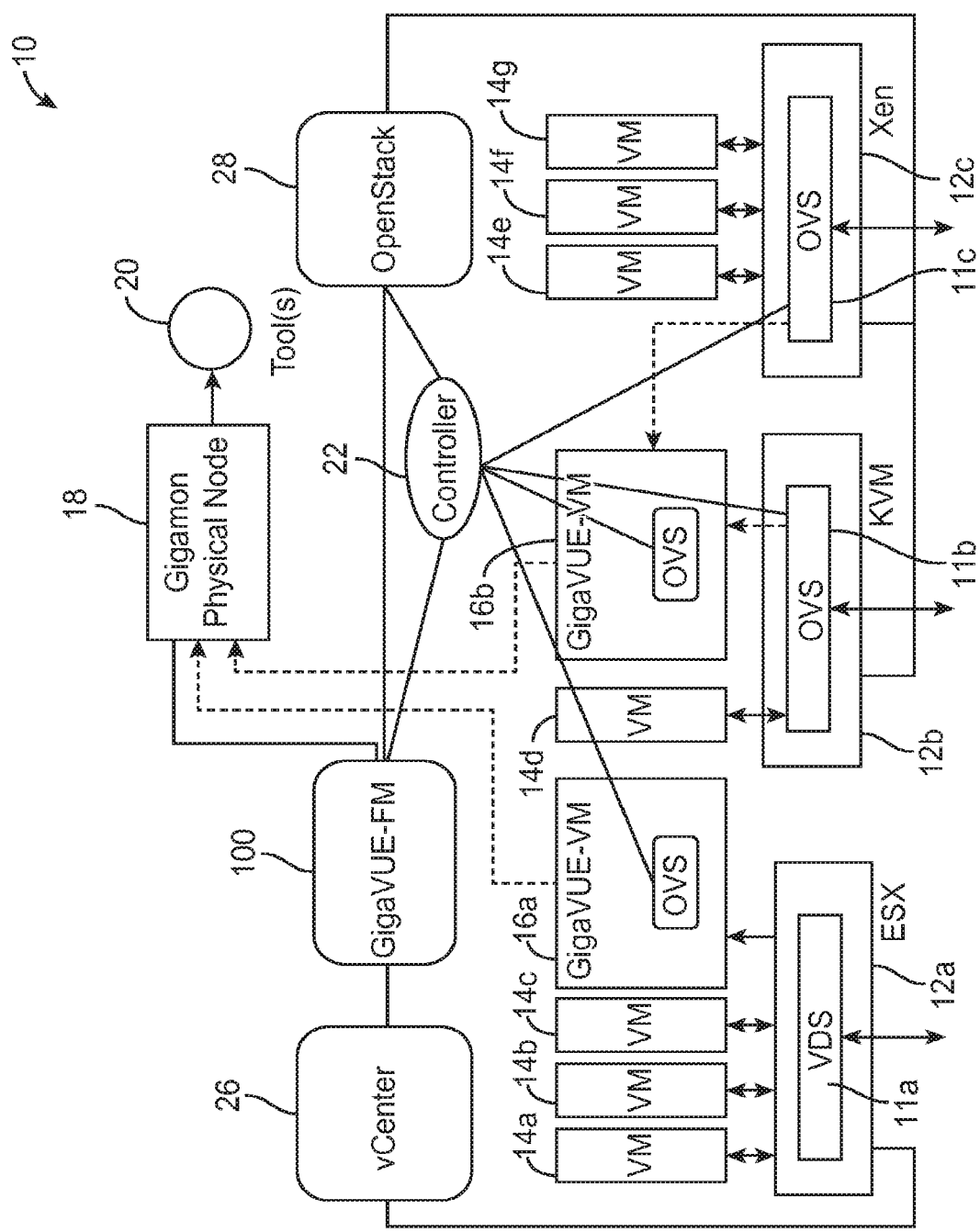
FIG. 2 illustrates another network in accordance with some embodiments.

It should be noted that the auxiliary network 10 is not limited to the example illustrated in FIG. 1, and that the auxiliary network 10 may have other configurations in other examples. For example, as shown in FIG. 2, the auxiliary network 10 may include multiple virtual switches 11a-11c at multiple hosts 12a-12c. The virtual switch 11a is not a part of the auxiliary network 10. The virtual switches 11b, 11c are parts of the auxiliary network 10, and therefore they may be considered service nodes P0. As shown in the figure, the host 12a supports VMs 14a-14c, the host 12b supports VM 14d, and the host 12c supports VMs 14e-14g. However, the VMs 14 are not parts of the auxiliary network. The auxiliary network 10 may also include multiple VMs 16a, 16b. The VM 16a is associated with the host 12a, and the VM 16b is associated with the host 12b. Although one network device 18 is shown, in other examples, there may be multiple network devices 18, each of which configured to communicate with one or more tools 20.

FIG. 2 shows two examples of virtualization management layer (or infracture), one being vCenter 26 and the other being OpenStack 28. Although only one vCenter 26 and one openstack 28 are shown, in other examples, there may be multiple vCenters 26 and/or multiple openstacks 28. As shown in FIG. 2, there is a SDN controller 22, which communicates with various components in the network 10. The SDN controller 22 may communicate with virtual switch(es) 11 implemented at one or more of the hosts 12a, 12b, 12c, either directly, or indirectly through the vCenter 26 and/or the openstack 28. The SDN controller 22 may also communicate with the VMs 16a, 16b.

As discussed, the virtual switch 11, the VM 16, and the network device 18 are parts of an auxiliary network configured to obtain packets from a production network, and to pass packets to the tool(s) 20 for analysis. There are various paths for passing the packets downstream to the tool(s) 20. For example, in a first scenario, a packet may be transmitted by the virtual switch 11 to the VM 16, and then from the VM 16 to the network device 18. The network device 18 then passes the packet to the tool(s) 20. In a second scenario, a packet may be transmitted by the virtual switch 11 to the VM 16, and the VM 16 may then pass the packet directly to the tool(s) 20 without going through the network device 18. In a third scenario, the virtual switch 11 may pass the packet to the network device 18 without going through the VM 16, and the network device 18 then passes the packet to the tool(s) 20. In a fourth scenario, the virtual switch 11 may pass a packet directly to tool(s) 20 without going through the VM 16 and the network device 18.

Chain of Service Nodes

In accordance with some embodiments, the fabric manager 100 is configured to create a service chain connecting one or more of the nodes (e.g., P0, P1, P2). For example, in some embodiments, the service chain may include a P0 node representing the virtual switch 11, a P1 node representing the VM 16, and a P2 node representing the network device 18. The fabric manager 100 may create virtual links connecting some of nodes P0, nodes P1, and nodes P2 to create the service chain. The created service chain dictates which service node(s) in the auxiliary network packets are to traverse in order to reach certain tool(s) 20. Accordingly, the service chain controls the behavior of one or more of the service nodes in the auxiliary network so that packets extracted from the production network may be forwarded to the tool(s) 20 in a certain manner.

The service chain created by the fabric manager 100 is configured to control the behavior of the nodes P0, P1, P2, or any combination of the foregoing, that are parts of the auxiliary network. In particular, the virtual links prescribe how packets obtained from the traffic production network are to be processed and passed between nodes to reach one or more tools 20. For example, a virtual link connecting from a P0 node (representing a virtual switch 11) to a P1 node (representing a VM 16) would prescribe that packet from the virtual switch 11 is to be passed to the VM 16. A virtual link connecting from a P1 node to a P2 node (representing a network device 18) would prescribe that packet from the VM 16 is to be passed to the network device 18. Similarly, a virtual link connecting from a P0 node to a P2 node would prescribe that packet from the virtual switch 11 is to be passed to the network device 18 to bypass the VM 16. In addition, a virtual link connecting from a P0 node to a P3 node (representing a network monitoring tool) would prescribe that packet from the virtual switch 11 is to be passed directly to tool 20 without going through the VM 16 and the network device 18. In the illustrated embodiments, SDN principles may be employed by the fabric manager 100 for managing the service nodes.

In the illustrated embodiments, the fabric manager 100 provides control and policy decisions, and is responsible for defining the behavior and roles of the P0, P1 and P2 nodes (that constitute the distributed data plane). The actual service chain determination (which may involve determining the number of service nodes in the chain, their identities, and the links connecting the service nodes) is also performed by the fabric manager 100. Accordingly, the fabric manager 100 provides a centralized policy decision making, which leads to more efficient use of the individual service nodes within the overall software-defined visibility fabric.

In some cases, the fabric manager 100 may be implemented using software that is run on a device. By means of non-limiting examples, the device may be a computer, a laptop, a server, a tablet, an iPad, a phone, a network device, or any of other devices that is capable of performing communication.

Figure 3:
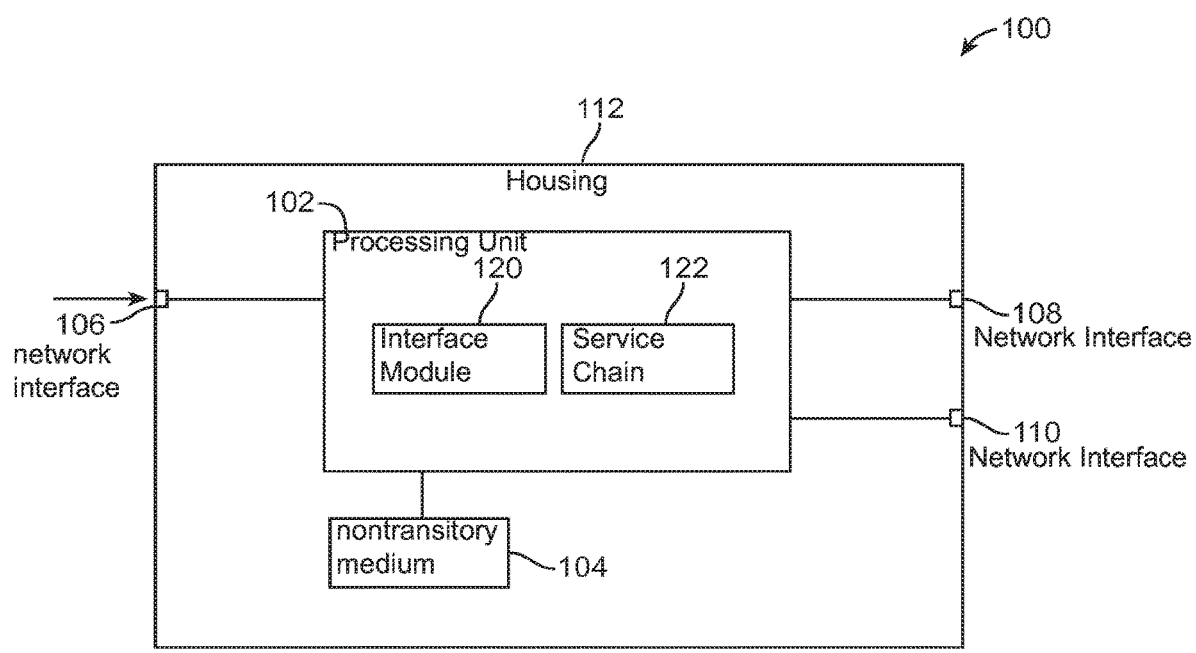
FIG. 3 illustrates a fabric manager that includes a service chain creation module in accordance with some embodiments.

An example of the fabric manager 100 will now be descried. FIG. 3 illustrates a block diagram of the fabric manager 100 in accordance with some embodiments. The fabric manager 100 includes a processing unit 102 and a non-transitory medium 104 communicatively coupled to the processing unit 102. The fabric manager 100 also includes a network interface 106 for receiving information from a user. In other cases, there may be multiple network interfaces 106 for receiving information from multiple users. The fabric manager 100 also includes a network interface 108 configured to communicate with a controller (e.g., the SDN controller 22), and a network interface 110 configured to communicate with a network device (e.g., the network device 18). Although only one network interface 108 and one network interface 110 are shown, in other examples, the fabric manager 100 may include multiple network interfaces 108 for communicating with multiple controllers 22, and/or multiple network interfaces 110 for communicating with multiple network devices 18. In other embodiments, two or more of the network interfaces 106, 108, 110 may be combined and be implemented as a single network interface. In the illustrated example, the processing unit 102 and the non-transitory medium 104 are accommodated in a housing 112 of the fabric manager 100. The housing 112 allows the fabric manager 100 to be carried, transported, sold, and/or operated as a single unit. Alternatively, the non-transitory medium 104 may be external to the housing 112. For example, the non-transitory medium 104 may be one or more storages/databases that are communicatively coupled to the processing unit 102. The network interfaces 106, 108, 110 are located at a periphery of the housing 112. In other embodiments, the network interfaces 106, 108, 110 may be located at other locations relative to the housing 112.

The processing unit 102 may be implemented using an integrated circuit, such as a processor. A processor may be a general processor, a network processor, an ASIC processor, a FPGA processor, etc. In other embodiments, the processing unit 102 may be a field processor. In further embodiments, the processing unit 102 may be a network card. In some cases, the processing unit 102 may be implemented using hardware, software, or a combination of both.

As shown in the figure, the processing unit 102 includes a user interface module 120 configured to provide a user interface for allowing a user of the fabric manager 100 to enter inputs. The processing unit 102 also includes a service chain creation module 122 configured to create a service chain based on certain criteria. In some cases, the criteria may be implemented in the processing unit 102 during a manufacturing process. In other cases, the criteria may be input (e.g., via the network interface 106) by an administrator of the fabric manager 100. In further cases, the criteria may be input a user (e.g., via the network interface 106).

The non-transitory medium 104 is configured to store information regarding various network components that may be linked by a service chain created using the processing unit 102. In some cases, the stored information may include identities of a plurality of service nodes (e.g., P0 nodes, P1 nodes, P2 nodes, etc.) representing different respective network components. In the illustrated embodiment, the service nodes are organized into different respective categories of nodes that include at least a first category of service nodes, a second category of service nodes, and a third category of service nodes. For example, the service node P0 in the first category of nodes represents a virtual switch 11, the service node P1 in the second category of nodes represents a virtual machine (e.g., VM 16), and the service node P2 in the third category of nodes represents a network device (e.g., network device 18, which may be a network switch appliance configured to communicate with one or more network monitoring tools). Information regarding the different categories of nodes are stored in the non-transitory medium 104. Also, in the illustrated embodiment, the P0 service nodes in the first category are configured to provide a first category of services, the P1 service nodes in the second category are configured to provide a second category of services, and the P2 service nodes in the third category are configured to provide a third category of services. Information regarding the different categories of services are also stored in the non-transitory medium 104. In the illustrated embodiment, each of the service nodes P0, P1, P2 represents a network component that can filter, manipulate, and dispatch network packets. However, the complexity of these tasks increases from P0 to P1 to P2. Accordingly, P0 node has higher packet processing efficiency than P1 node, and P1 node has higher packet processing efficiency than P2 node. However, P2 node has higher packet processing intelligence than P1 node, and P1 node has higher packet processing intelligence than P0 node. Information regarding packet processing efficiency and packet processing intelligence for the different nodes or categories of nodes may be stored in the non-transitory medium 104.

In some cases, the user interface module 120 is configured to provide a user interface for allowing a user of the fabric manager 100 to enter service node information. The created service node information may then be stored in the medium 104. By means of non-limiting examples, the service node information may include service node identity, service node category, type of network component represented by the service node, identity of network component represented by the service node, type of services provided by the network component represented by the service node, functionalities of the network component, etc., or any combination of the foregoing. In other cases, the fabric manager 100 may obtain the service node information from one or more network devices.

After the service node information has been obtained by the fabric manager 100, the fabric manager 100 may then create a service chain connecting some of the service nodes. In some cases, the service chain creation module 122 may be configured to automatically generate one or more links to connect certain service nodes based on one or more predefined criteria. For example, the user may enter input prescribing certain functions be performed on a packet. In such cases, the service chain creation module 122 may automatically select certain service nodes and automatically create one or more links to connect them so that the service chain of service nodes will provide the required functionalities indicated by the user input.

In other cases, instead of configuring the fabric manager 100 to automatically create a service chain, a user can use the interface provided by the user interface module 120 to enter link information and to identify the service nodes to be connected by a link. The service chain creation module 122 of the processing unit 102 then associates the created link with the two nodes, and passes them to the medium 104 so that the link information may be stored in association with the service node information regarding the two service nodes connected by the link.

Figure 4:
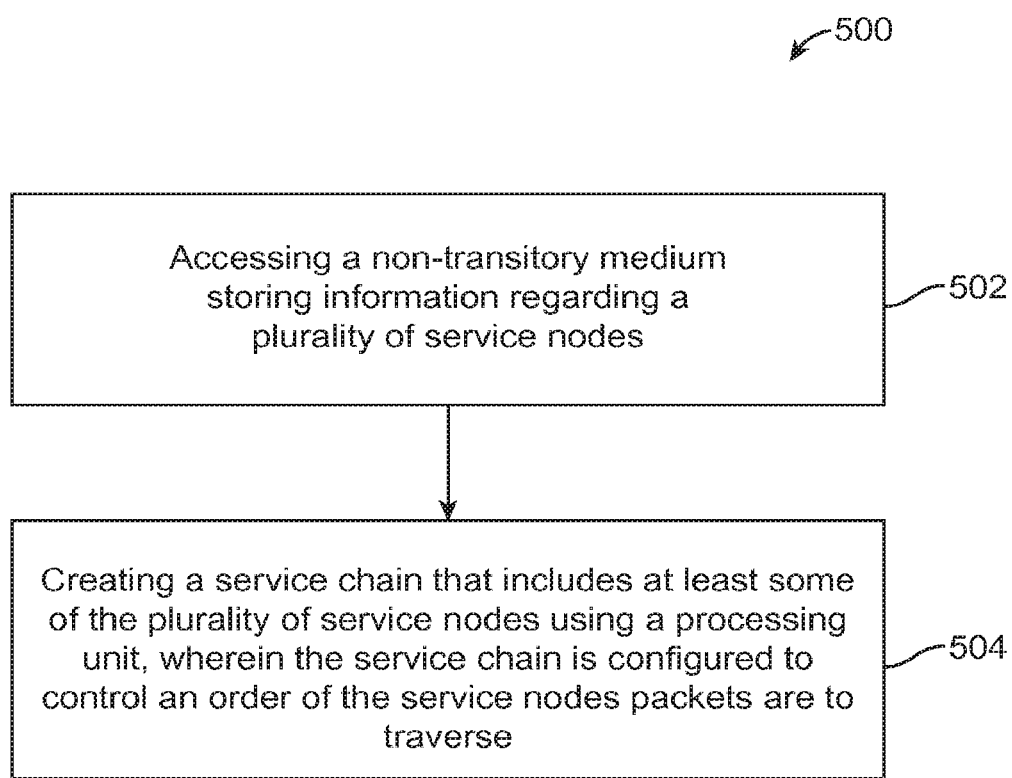
FIG. 4 illustrates a method of creating a service chain of service nodes in accordance with some embodiments.

FIG. 4 illustrates a method 500 of creating a service chain using the fabric manager 100. First, the processing unit 102 of the fabric manager 100 accesses the non-transitory medium 104 that stores information regarding a plurality of service nodes (item 502). For example, the medium 104 may store information regarding P0 service node, P1 service node, and P2 service node. In such cases, item 502 may be performed by the processing unit 102 that accesses the non-transitory medium 104 storing these information.

Next, the processing unit 102 of the fabric manager 100 creates a service chain that includes at least some of the plurality of service nodes (item 504). In some cases, the processing unit is configured to create virtual links to connect some of the service nodes to create the service chain. For example, the creation of the service chain may be performed automatically by the processing unit based on certain algorithm that considers processing efficiency and processing complexity (or intelligence). In other cases, the processing unit 102 may create the service chain in response to a user input that prescribes certain service nodes are to be connected by the virtual links. In other cases, the service chain may be automatically created based on one or more criteria provided by the user. For example, the user may enter input prescribing certain services (e.g., types of services, level of services) to be performed on a packet. A service may involve packet manipulation, filtering, forwarding, or any combination of the foregoing. In such cases, the processing unit 102 may automatically select certain nodes to be connected by the links so that the user-prescribed criteria is met. The service chain is configured to control an order of network components (represented by the service nodes) in the auxiliary network packets are to traverse. In some cases, the created service chain governs the behavior of various network components represented by the service nodes so that packets may be transmitted downstream in a certain manner for processing by one or more tools.

Overlay Technique

In some embodiments, overlay technique may be employed by the fabric manager 100 to implement service chain(s) for the auxiliary network. For example, the service chain creation module 122 in the fabric manager 100 may include an overlay module that uses an overlay technique to create an auxiliary network for a certain user. In such cases, the overlay module is configured to provide multiple overlays for different respective users. For example, overlay module in the fabric manager 100 may apply a first overlay to connect a first set of service nodes (e.g., P0 service node(s), P1 service node(s), P2 service node(s), or any combination of the foregoing) in the auxiliary network for a first user (e.g., an owner of a network monitoring tool). The overlay module in the fabric manager 100 may also apply a second overlay to connect a second set of service nodes in the auxiliary network for a second user (e.g., an owner of a network monitoring tool). The service nodes in the first set may all be the same as those in the second set, all different from those in the second set, or may have a subset that is the same as that in the second set. Accordingly, using the overlay technique, a certain service node in the auxiliary network may be a part of different service chains for different users. However, packets associated with the respective overlays remain isolated from each other, and also isolated from the traffic production network.

Flexibility of Service Chain

The service chain is flexible in the sense that it can be modified and/or scaled by the fabric manager 100. For examples, one or more service nodes may be added to the service chain, one or more service nodes may be removed from the service chain, etc.

Figure 5A:
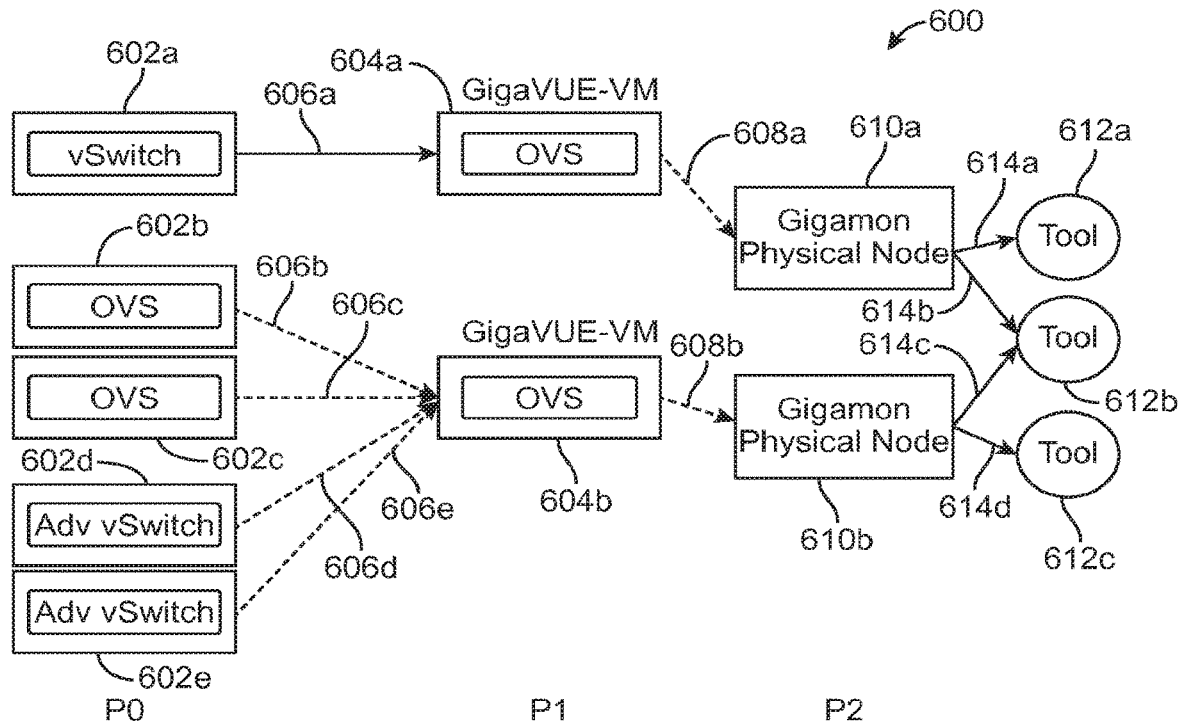
FIGS. 5A-5I illustrates different examples of a service chain.

FIG. 5A illustrates an example of a service chain 600 that may be created by the fabric manager 100 to implement an auxiliary network. As shown in the figure, the service chain 600 includes multiple P0 nodes 602a-60260e connected to multiple P1 nodes 604a-604b via virtual links 606a-606e. In particular, the link 606a prescribes network traffic from the P0 node 602a to be transmitted to P1 node 604a for processing, and the links 606b-606e prescribe network traffic from the P0 nodes 602b-602e, respectively, to be transmitted to P1 node 604b for processing. The service chain 600 also includes multiple virtual links 608a-608b connecting the P1 nodes 604a-604b to P2 nodes 610a-610b. In particular, the link 608a prescribes network traffic from the P1 node 604a to be transmitted to P2 node 610a for processing, and the link 608b prescribes network traffic from the P1 node 604b to be transmitted to P2 node 610b for processing. The service chain 600 also includes multiple links 614a-614d connecting the P2 nodes 610a, 610b to tools 612a-612c. The links 614a, 614b indicate that network traffic from the P2 node 610a is to be processed by the tools 612a, 612b. The links 614c, 614d indicate that network traffic from the P2 node 610b is to be processed by the tools 612b, 612c.

Although the service chain 600 is illustrated as having five P0 nodes 602, two P1 nodes 604, two p2 nodes 610, and three tools 612, in other examples, the service chain 600 may have more than five P0 nodes 602 or fewer than five P0 nodes 602, more than two P1 nodes 604 or fewer than two P1 nodes 604, more than two P2 nodes 610 or fewer than two P2 nodes 610, and/or more than three tools 612 or fewer than three tools 612.

In the illustrated example, the P0 nodes 602 represent a first category of network components (e.g., the virtual switch 11), the P1 nodes 604 represent a second category of network components (e.g., the VM 16), and the P2 nodes 610 represent a third category of network components (e.g., the physical network device 18). In some cases, the network device represented by the P2 node 610 may be a switch appliance configured to pass packets to one or more tools, such as the tool(s) 612. It should be noted that the network components represented by the P0 nodes 602, the P1 nodes 604, and the P2 nodes 610 are not limited to the above examples.

Figure 5B:
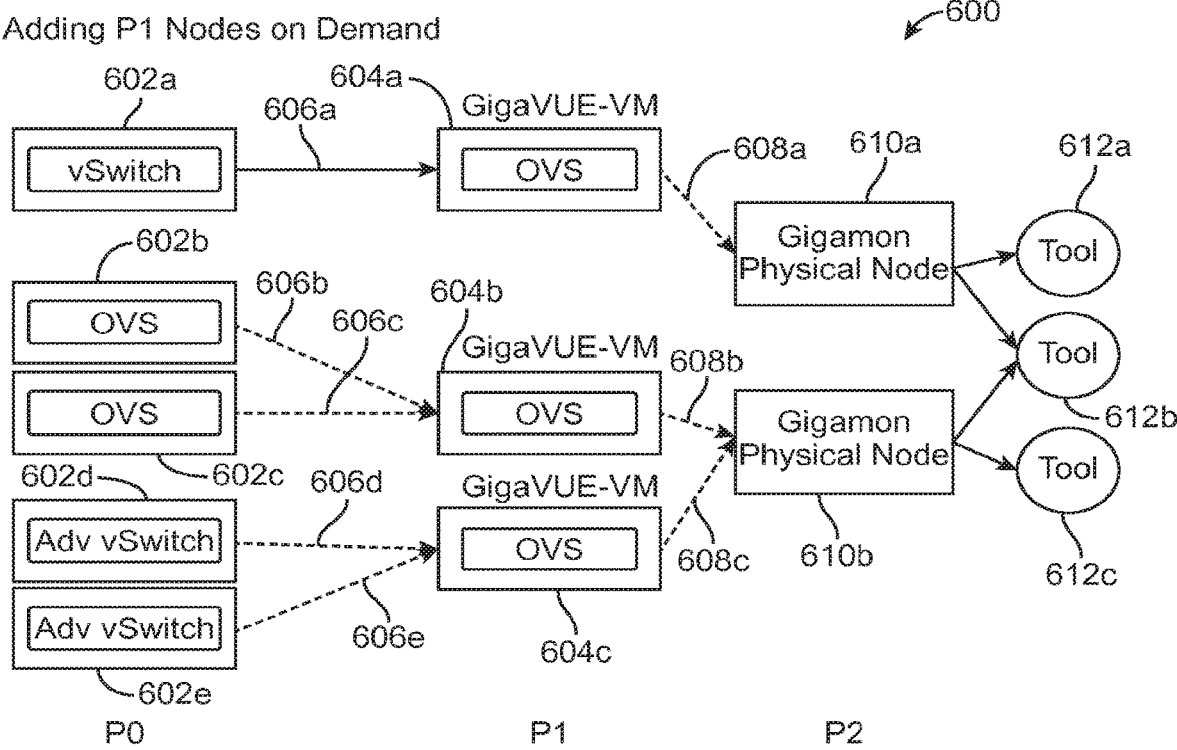

In some cases, the fabric manager 100 may be operated (e.g., based on input from a user) to add a node to the service chain 600. FIG. 5B illustrates an additional P1 node 604c added to the service chain 600 of FIG. 5A. Such configuration is advantageous because it allows the workload previously handled by the P1 node 604b to be distributed between two P1 nodes 604b, 604c. In some cases, the fabric manager 100 may add the P1 node 604c to the service chain 600 by including the P1 node 604c as part of the service chain 600, and by changing the links 606d, 606e so that they are connected between the P0 nodes 602d, 602e and the P1 nodes 604c. Also, a new virtual link 608c may be created by the fabric manager 100 to connect the newly added P1 node 604c to the P2 node 610b. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as being modified by adding a P1 node. In other examples, the service chain 600 may be modified by the fabric manager 100 by adding one or more P0 nodes, one or more P1 nodes, one or more P2 nodes, or any combination of the foregoing.

Figure 5C:
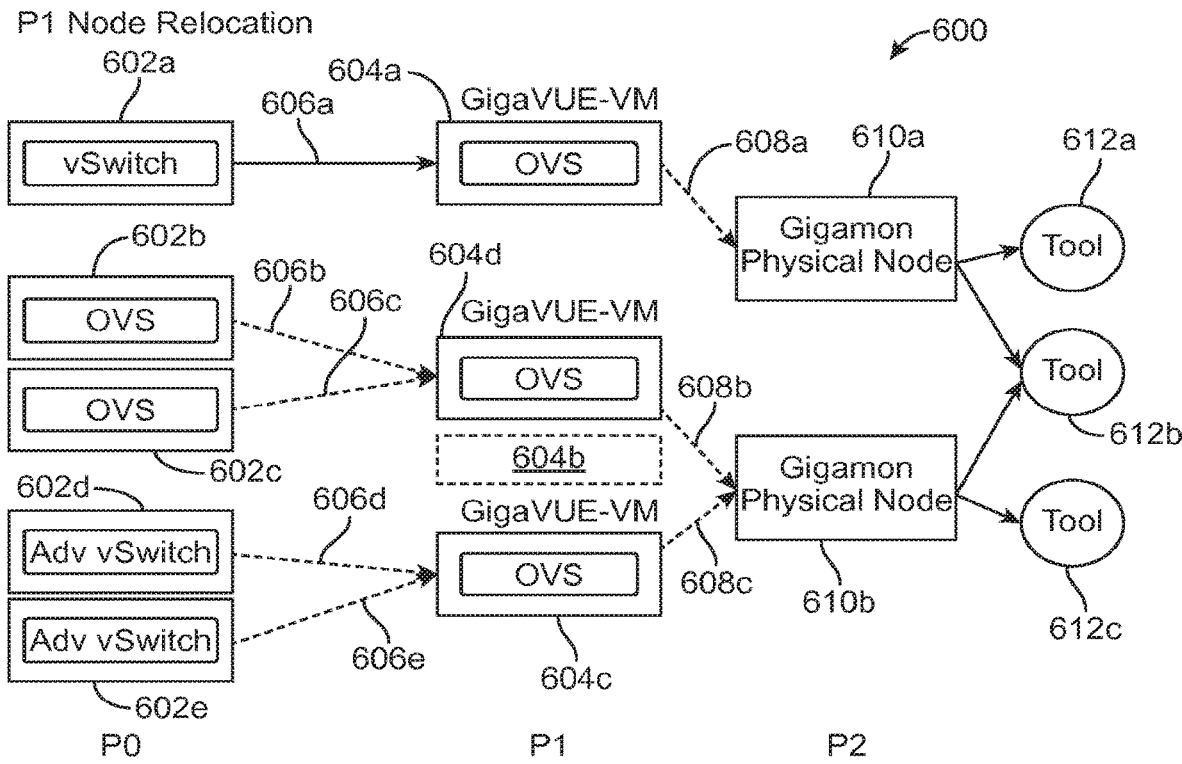

In some cases, the fabric manager 100 may be operated (e.g., based on input from a user) to relocate a node in the service chain 600. FIG. 5C illustrates the same service chain 600 of FIG. 5B, except that P1 node 604b has been relocated to new P1 node 604d. Such configuration is advantageous because it allows the P1 node 604b to be disconnected from the service chain 600 if the network component(s) associated with the P1 node 604b is unavailable, e.g., due to service, maintenance, malfunction, etc. In some cases, the fabric manager 100 may add the P1 node 604d to the service chain 600 by including the P1 node 604d as part of the service chain 600, and by changing the links 606b, 606c so that they are connected between the P0 nodes 602b, 602c and the new P1 node 604d. Also, the virtual link 608b is changed so that it is connected between the P1 node 604d and the P2 node 610b. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as being modified by relocating a P1 node. In other examples, the service chain 600 may be modified by the fabric manager 100 by relocating one or more P0 nodes, one or more P1 nodes, one or more P2 nodes, or any combination of the foregoing.

Figure 5D:
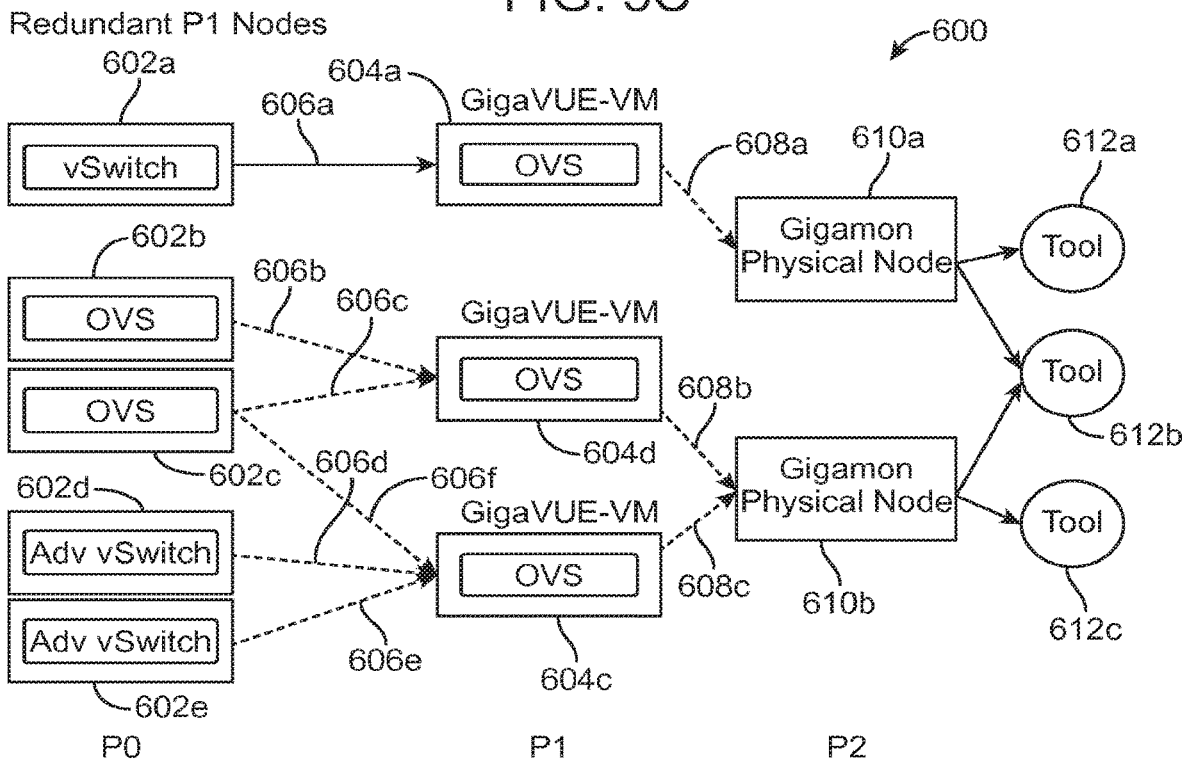
Figure 5E:
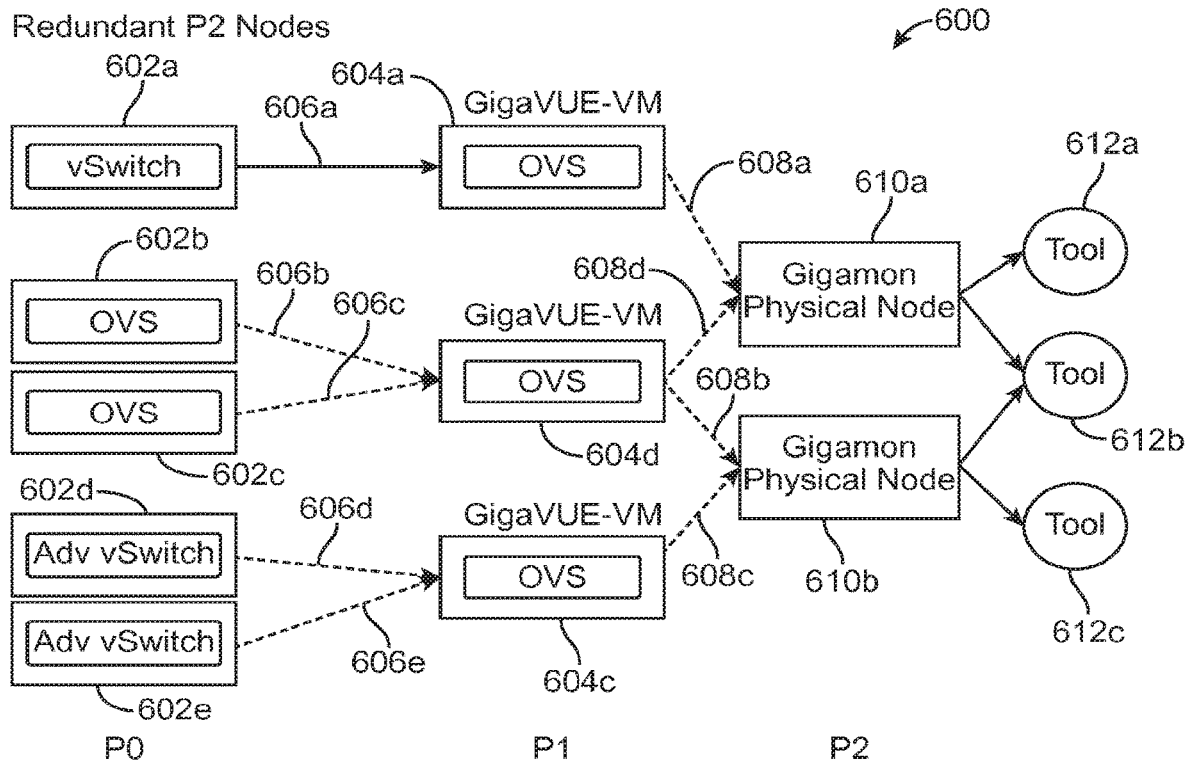
Figure 5F:
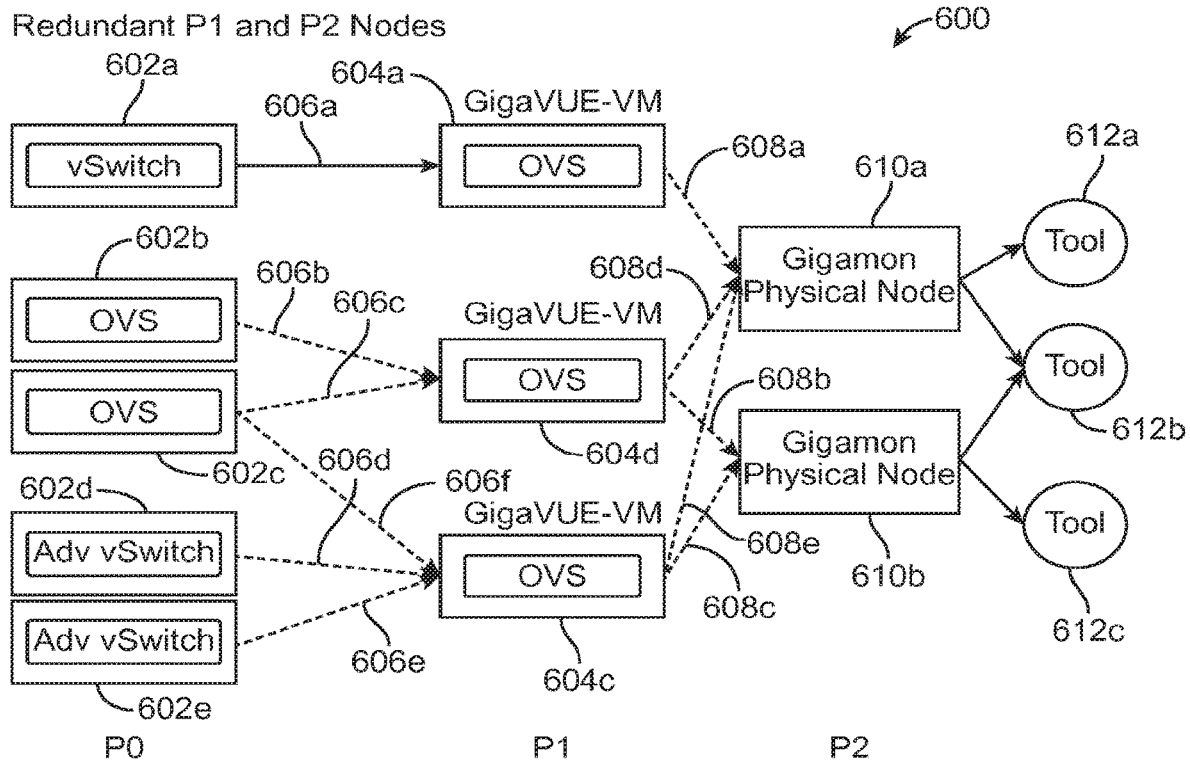

In some cases, the fabric manager 100 may be operated (e.g., based on input from a user) to provide redundant node(s) in the service chain 600. FIG. 5D illustrates the same service chain 600 of FIG. 5C, except that a new virtual link 606f is added by the fabric manager 100 to connect the P0 node 602c to the P1 node 604c. Such configuration is advantageous because it allows both the P1 node 604d and the P1 node 604c to be connected to the same P0 node 602c, so that network traffic from the P0 node 602c can be processed by both p1 nodes 604c, 604d. In some cases, the P1 nodes 604c, 604d may process the same network traffic from the P0 node 602c. In other cases, the P1 nodes 604c, 604d may process different network traffic from the P0 node 602c. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as having two P1 nodes 604 connecting to the same P0 602 node. In other examples, the service chain 600 may be have more than two P1 nodes 604 connecting to the same P0 node 602, two or more P2 nodes 610 connecting to the same P1 node 604 (such as that shown in the example of FIG. 5E), or any combination of the foregoing (such as that shown in the example of FIG. 5F). In particular, the example shown in FIG. 5E is the same as that shown in FIG. 5F, except that a new virtual link 608d is added to the service chain 600 by the fabric manager 100. Such configuration allows packet from the P1 node 604d be transmitted to P2 node 610a and P2 node 610b for processing. The example shown in FIG. 5F is the same as that shown in FIG. 5D, except that there are two virtual links 808b, 808d connecting the P1 node 604d to the P2 nodes 610a, 610b to provide redundancy processing for the P1 node 604d, and that there are two virtual links 608c, 608e connecting the P1 node 604c to the P2 nodes 610a, 610b to provide redundancy processing for the P1 node 604c.

Figure 5G:
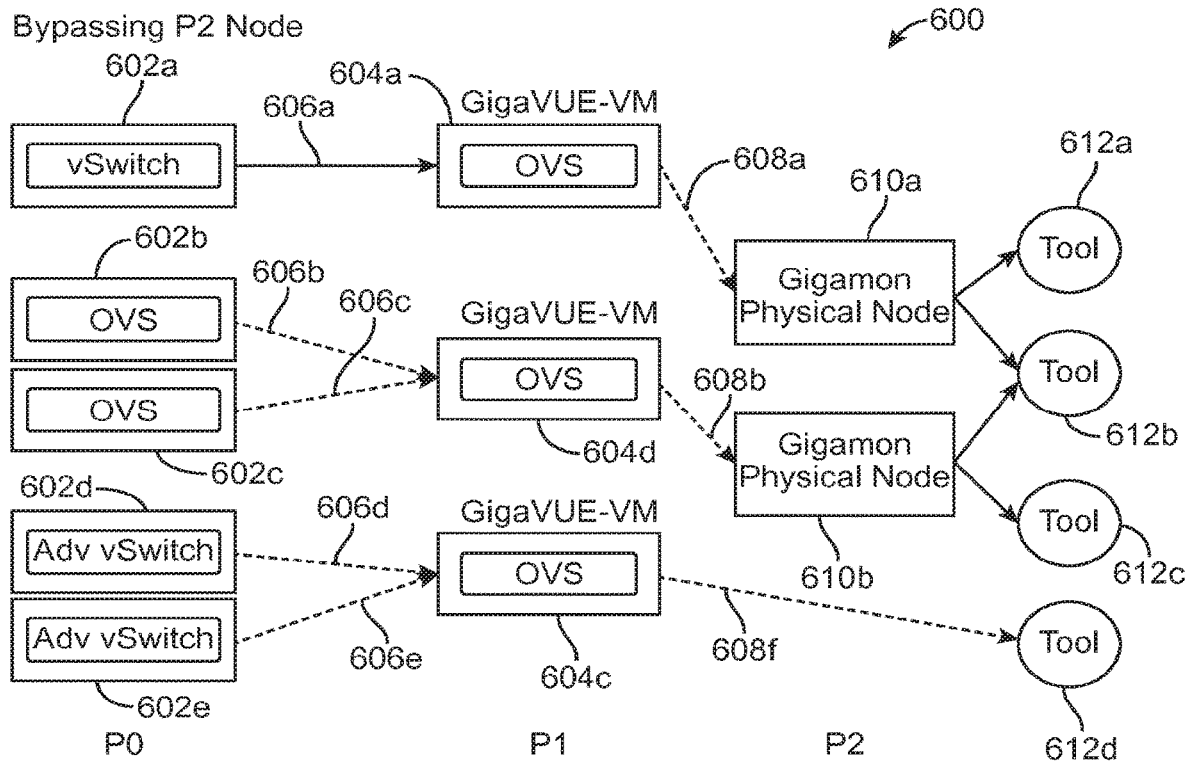
Figure 5H:
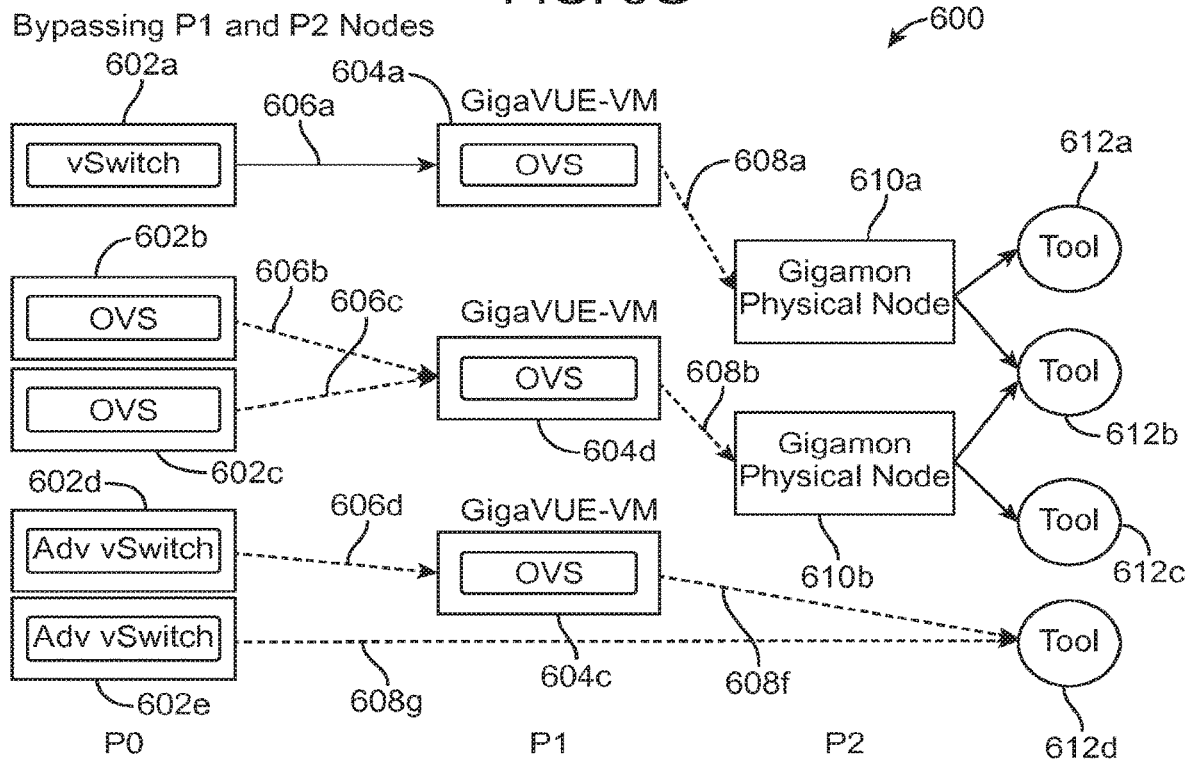

In some cases, the fabric manager 100 may be operated (e.g., based on input from a user) to bypass one or more node(s) in the service chain 600. FIG. 5G illustrates the same service chain 600 of FIG. 5E, except that the link 608c connecting the P1 node 604c to the P2 node 610b has been removed by the fabric manager 100, and the fabric manager 100 has added virtual link 608f connecting the P1 node 604c directly to tool 612d. Such configuration may be advantageous in situation in which processing by a P2 node 610 is not necessary, so network traffic may be passed from the P1 node 604 to the tool 612 directly. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as having the link 608f connecting the P1 node 604c and the tool 612d to bypass the P2 nodes 610. In other examples, the service chain 600 may have one or more links connecting one or more P0 nodes 602 to one or more P2 nodes 610 to bypass the P1 nodes 604. In further examples, the service chain 600 may be have one or more links (such as the link 608g shown in the example of FIG. 5H) connecting one or more P0 nodes 602 to one or more tools 612 to bypass the P1 nodes 604 and the P2 nodes 610. The configuration of FIG. 5H may be advantageous in situation in which processing by a P1 node 604 and a P2 node 610 is not necessary, so network traffic may be passed from the P0 node 602 to the tool 612 directly.

Figure 5I:
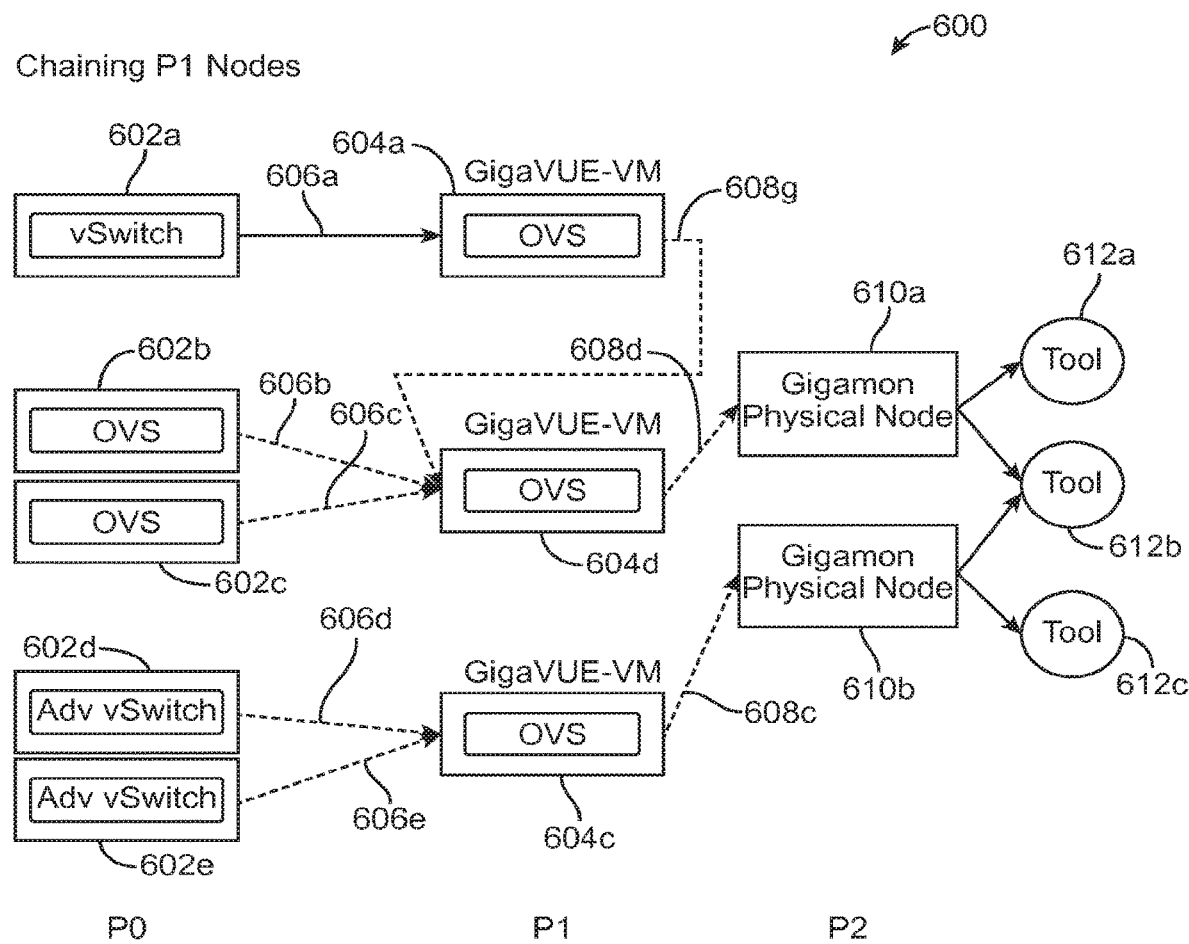

In some cases, the fabric manager 100 may be operated (e.g., based on input from a user) to chain multiple P1 nodes 604 in the service chain 600. FIG. 5I illustrates a service chain 600 that is similar to that of FIG. 5E, except that the link 608a connecting the P1 node 604a to the P2 node 610a has been removed by the fabric manager 100, and the fabric manager 100 has added virtual link 608g connecting the P1 node 604a directly to the P1 node 604d to create a chain/series of P1 nodes 604. Such configuration allows network traffic to be sequentially processed by two P1 nodes 604. The modified service chain 600 may then be stored in a non-transitory medium. For example, in some cases, information regarding the P0 nodes 602, P1 nodes 604, and P2 nodes 610, and information regarding the links 606 and the links 608 may be stored in the non-transitory medium. In the above example, the service chain 600 is illustrated as having the link 608g connecting two P1 nodes 604 in a series. In other examples, the service chain 600 may have multiple links connecting more than two P1 nodes 604 in series. Also, in other examples, the service chain 600 may have one or more links connecting two or more P0 nodes 602 in a series, one or more links connecting two or more P1 nodes 604 in a series, one or more links connecting two or more P2 nodes 610 in a series, or any combination of the foregoing.

As illustrated in the above examples, the fabric manager 100 is advantageous because it can create a service chain 600 by connecting different categories of nodes (e.g., P0 node(s), P1 node(s), P2 node(s), etc.). The different categories of nodes represent network components that provide different respective categories of services. For example, P0 nodes 602 may provide a first category of service, and P1 nodes 604 may provide a second category of service that is different from (e.g., more advance than) the first category of service of the P0 nodes 602. Similarly, P2 nodes 610 may provide a third category of service that is different from (e.g., more advance than) the first category of service of the P0 nodes 602 and the second category of service of the P1 nodes 604. Thus, if the fabric manager 100 determines that the service (functionality) of the P2 node 610 is not needed, then the fabric manager 100 may create virtual link in the service chain 600 to bypass the P2 node 610. Similarly, if the service (functionality) of the P1 node 604 is not needed, then the fabric manager 100 may create virtual link in the service chain 600 to bypass the P1 node 604.

As discussed, the fabric manager 100 may be configured to create a service chain connecting one or more of the nodes (e.g., P0, P1, P2). The created service chain dictates which service node(s), and the order of the service node(s), in the auxiliary network packets are to traverse in order to reach certain tool(s) 20. Accordingly, the service chain controls the behavior of one or more of the service nodes in the auxiliary network so that packets may be forwarded to the tool(s) 20 in a certain manner. The creation of the service chain can be performed automatically by the fabric manger 100. In some cases, the fabric manger 100 may create the service chain based on certain user input. For example, a user may enter service node information and/or service criteria through a user interface, and the fabric manager 100 may create a service chain connecting some of the service nodes based in the user input. In some cases, the service criteria entered by the user may include an identification of a service, such as a type of service and/or a level of service. A service may be packet manipulation, packet filtering, packet forwarding, or any combination of the foregoing.

As discussed, a user may enter service node information for the fabric manager 100. In other cases, the fabric manager 100 may be configured to obtain service node information from one or more network devices. For example, such may be accomplished by the fabric manager 100 communicating with the SDN controller 22, the vCenter 26, the openstack 28, or any combination of the foregoing. The fabric manager 100 may also communicate directly with the hosts 12a-12c, directly with the VMs 16a-16b, and/or directly with the network device 18. By means of non-limiting examples, the information regarding the network 10 obtained by the fabric manager 100 may include identities of the virtual switch(s) 11, locations of the virtual switch(s) 11, states of the virtual switch(s) 11, protocols used by the virtual switch(s) 11, network processing policies used by the virtual switch(s) 11, information stored in association with the virtual switch(s) 11, or any combination of the foregoing. The information may also include identities of the VMs 16, locations of the VMs 16, states of the VMs 16, protocols used by the VMs 16, network processing policies used by the VMs 16, applications running on the VMs 16, information stored at the VMs 16 or in association with the VMs 16, or any combination of the foregoing. The information may also include identity of the network device 18, location of the network device 18, state of the network device 18, protocol used by the network device 18, network processing policy used by the network device 18, applications running on the network device 18, information stored at the network device 18 or in association with the network device 18, or any combination of the foregoing. The information may also include a mapping between a virtual machine host and a virtual machine workload, or any combination of the foregoing. In some embodiments, the information may be a mapping between an outer header (e.g., the addresses of the source and/or destination VM hosts) and inner header (e.g., the addresses of the actual VM) of a packet that has a tunnel format, wherein the outer header may be due to an encapsulation of an original packet resulted from virtualizaton technology.

Packet Processing Efficiency Vs. Packet Processing Intelligence

In some cases, the processing unit 102 in the fabric manager 100 may be configured to balance packet processing efficiency and service intelligence when creating the service chain. For example, if a user desires higher processing efficiency and does not mind lower processing capabilities, then the processing unit 102 may select the service node (e.g., P0 service node) that will provide the highest efficiency while still meeting the minimum processing capabilities. On the other hand, if the user desires higher processing capabilities and does not care as much about efficiency, then the processing unit 102 may select the service node (e.g., P2 service node) that will provide the highest processing capabilities. Also, in some cases, the processing unit 102 (e.g., the service chain creation module 122 of the processing unit 102) may be configured to determine the shortest possible or the most efficient service chain. The more expensive (higher numbered) service nodes, such as P2 service nodes, are included only when the added benefits provided by them are required. In this way the service chain creation module 122 of the processing unit 102 is constantly trying to balance packet processing efficiency versus packet processing intelligence.

In the illustrated embodiment, the P1 node 604 represents a network component that performs more complicated network traffic processing (e.g., higher processing intelligence) compared to the P0 node 602. Also, the P2 node 610 represents a network component that performs more complicated network traffic processing (e.g., higher processing intelligence) compared to the P1 node 604. Accordingly, the P0 node is more efficient in packet processing compared to the P1 node, and the P1 node is more efficient in packet processing compared to the P2 node. In some embodiments, the service chain creation module 122 is configured to consider processing efficiency and processing intelligence when creating the service chain 600. For example, the service chain creation module 122 in the fabric manager 100 may balance processing efficiency and processing intelligence when selecting which type of nodes (e.g., P0 node, P1 node, P2 node, etc.) to include in the service chain 600.

Figure 6A:
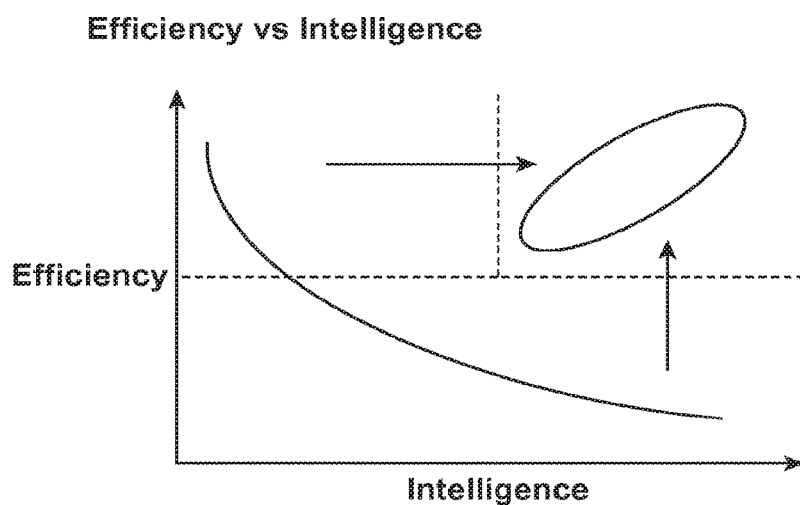
FIG. 6A illustrates network processing efficiency versus network processing intelligence.
Figure 6B:
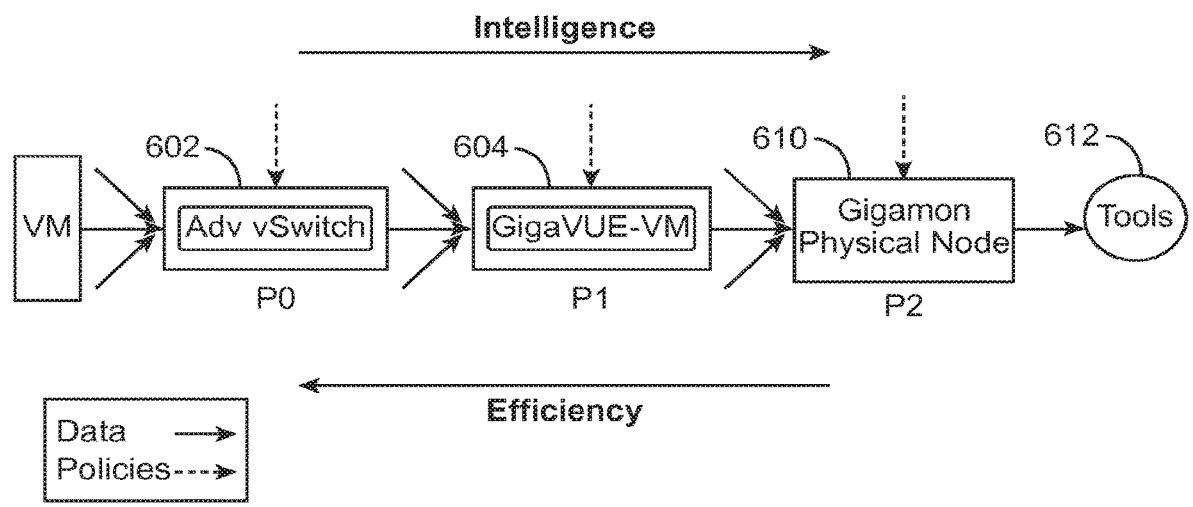
FIG. 6B illustrates network processing efficiency and network processing intelligence for different network components in a network.

FIG. 6A illustrates a graph, showing processing efficiency being inversely related to processing intelligence. As shown in the figure, higher processing intelligence may require more processing resource (e.g., time, memory, etc.), and so the corresponding processing efficiency is lower. FIG. 6B illustrates processing efficiency and processing intelligence as functions of the different types of nodes. Since P2 nodes 610 provide higher processing intelligence (e.g., it can perform more complicated packet filtering, packet manipulation, packet forwarding, etc.) compared to P0 nodes 602 and P1 nodes 604, P2 nodes 610 have relatively lower processing efficiency. On the other hand, since P0 nodes 602 provide relatively lower processing intelligence (e.g., it can perform less complicated packet filtering, packet manipulation, packet forwarding, etc.) compared to P1 nodes 604 and P2 nodes 610, P0 nodes 602 have relatively higher processing efficiency compared to P1 nodes 604 and P2 nodes 610. When creating the service chain 600, the service chain creation module 122 in the fabric manager 100 may consider the relationship shown in FIG. 6B, and automatically determine whether to include P0 node, P1 node, P2 node, or any combination of the foregoing, in the service chain 600.

(II) Automatic Target Selection

General Description of Automatic Target Selection

Virtual machine (VM) traffic monitoring requires an end-user to perform the following tasks as part of the workflow for initiating a monitoring session: (1) Identify targets desired to be monitored, (2) Define filters, and (3) Specify actions.

A target in this context may be a VM or a virtual network interface card (vNIC) belonging to a VM. A target may be a source of packets, or a recipient of packets. User-defined filters may be expressed as rules in a map. A rule specifies filter components (e.g., L1, L2, L3, L4) that must be satisfied simultaneously. A map is a collection of one or more rules and some associated actions, which get executed whenever any rule in the map has a match. Typical actions involve packet manipulation (e.g. truncation), forwarding (e.g. tunnel to specified destination), packet dropping, or any combination of the foregoing.

Automatic Target Selection (ATS) simplifies the user workflow by eliminating the first step. In ATS, the targets to be monitored are inferred from the specified filters. The user, however, has the option to guide the selection process, if necessary.

An ATS algorithm will now be described. In the ATS algorithm, targets are inferred from filters. In particular, ATS is based on the idea that only those targets whose ingress/egress traffic can potentially result in a match with the user-defined filters need to be monitored (while the remaining targets can be safely ignored). The target selection process therefore involves deriving the set of all such targets for a given map and is carried out as follows.

1. A filter component set C is created for each of the m supported L1-L3 filter components.

$$C = \begin{cases} \text{subset of } V \text{ associated with local} \\ L1 - L3 \text{ filter component (if specified)} \\ V \end{cases}$$

wherein V denotes the universal set (which consists of all targets within the monitoring domain that are currently listed in the inventory). Thus, the filter component set C represents a subset of the available targets that satisfies a certain filter component if the filter component is specified by a user.

Only local L1-L3 filter components are considered when looking for subsets of V because remote filter components are not associated with the (local) monitoring domain. Also, L4 filter components are ignored as they do not help in identifying targets. Here are some examples of the filter components that may be considered:

L1—Switch port
L2—MAC address, VLAN id, ethertype
L3—IP address

2. Since all the filter components in a rule must be satisfied simultaneously, the filter set R for a rule is given by:

$$R = \bigcap_{i=1}^{m} C_i$$

In the above equation, "∩" is an intersection function. Note that the intersection of A and B, denoted A∩B, is the set of all items that are members of both A and B. Thu, the filter set R represents a set of targets that satisfy all of the filter components in a certain rule.

3. Because a map is considered to have a match if any of its rules has a match, the filter set F for a map with n rules is given by:

$$F = \bigcup_{j=1}^{n} R_j$$

In the above equation, "∪" is an union function. Note that the union of A and B, denoted A∪B, is the set of all items that are members of either A or B.

In some embodiments, the ATS may allow the user to guide the target selection process, if necessary, by creating special inclusion and/or exclusion sets.

The inclusion set contains only those targets that should be considered by ATS. The user can define it by identifying specific targets or by using an appropriate filter. Inclusion sets may be saved in a library (e.g., a non-transitory medium) for later use. The inclusion set I may be defined as follows:

$$I = \begin{cases} \text{targets to be included (if specified)} \\ V(\text{otherwise}) \end{cases}$$

The exclusion set contains targets that should not be considered by ATS. The user can define it by identifying specific targets or by using an appropriate filter. Exclusions sets may be saved in a library (e.g., a non-transitory medium) for later use. The exclusion set E may be defined as follows:

$$E = \begin{cases} \text{targets to be excluded (if specified)} \\ \phi(\text{otherwise}) \end{cases}$$

wherein Ø denotes the empty set.

The (final) target set for a map is based on its filter set and appropriate inclusion set I and exclusion set E, as follows:

$$T=(F \cap I)-E$$

In the above equation, "−" is a difference function. Note that the difference of A and B, denoted A-B, is the set of all items that are members of A but not members of B.

The ATS algorithm may be re-run whenever the inventory of targets is updated. This allows addition of new target(s) and/or changes in the existing target(s) be detected.

ATS can overcome the following disadvantages associated with manual selection of targets. The manual selection process to select targets can be tedious, especially when dealing with a very large number of potential targets. The manual selection technique will require a user to manually repeat the process every time a new map is created. Also, when new targets of interest appear in the monitoring domain, they have to be manually identified by the user and associated with a map, before they can be monitored.

One advantage of the manual target selection process is that the user has complete control over target selection. However, ATS can adequately match this capability because it allows the user to guide the selection process, if necessary.

Furthermore, ATS offers the following advantages. The selection process ensures that only the relevant targets (whose ingress/egress network traffic can potentially match rules in the map) are selected for monitoring. In the case where the user supplied inclusion and/or exclusion sets are incompatible with the filter set derived from the map, the system can flag a warning. In the manual target selection schemes, such incompatibilities cannot be easily detected.

Detail Description of Automatic Targets Selection

ATS may be implemented in different network environments. Examples of the network environment in which the ATS may be implemented/used are described above with reference to FIGS. 1-2. As discussed, ATS may be employed to determine targets for network traffic monitoring. Network traffic in a network is transmitted from a sender for an intended recipient through a traffic production network. VM traffic monitoring involves capturing packets from the traffic production network (e.g., packets entering and/or leaving VMs) and delivering them to appropriate tools for analysis. One way to achieve this, without adversely affecting VM traffic patterns in the traffic production network, is to mirror packets associated with certain VMs to an out-of-band network where they can be processed and eventually forwarded to the respective tools that perform analysis to monitor network traffic. In accordance with some embodiments, an auxiliary network is provided for this purpose. This auxiliary network (called "Software Defined Visibility Fabric"), described in section (I) above, is a policy driven network of chained service nodes. Each service node represents a packet processing station that can filter, manipulate and dispatch network packets. The auxiliary network is built by linking these service nodes together, e.g., using IP tunnels such as GRE, VxLAN, etc. The ATS described herein may be employed to determine targets for the auxiliary network for network traffic monitoring.

In some cases, for monitoring network traffic, a user may perform the following tasks for initiating a monitoring session: (1) identify targets desired to be monitored, (2) define filters, and (3) specify actions. A target in this context is a network component for which the network monitoring is performed. For example, if a user wants to monitor network traffic going to a certain target, then the user may identify such target in the monitoring session. By means of non-limiting examples, a target may be a VM, a vNIC, or any network component that is desired to be monitored.

The user-defined filters may be expressed as rules (filter rules) in a map (filter map). A rule may specify filter components (e.g., L1-L4) that are to be compared with packets to see if there is a match. A packet is considered as matching a rule if all of the filter components in the rule are met by the packet. In some cases a map may have one rule. In other cases, a map may have multiple rules.

The action specified by the user may be any action that is to be performed by one or more network components (e.g., by host 12, VM 16, network device 18, etc.) if a packet matches any rules in a map defined by the user. By means of non-limiting examples, an action may be any packet manipulation (e.g., tagging, truncation, etc.), packet forwarding (e.g., tunnel to a certain specified destination), etc. In some cases, the actions associated with a rule/map are executed whenever any rule in the map has a match. The search for a match may be performed sequentially or in parallel. Also, in some implementations, the search may be terminated after the first match. In addition, in some cases, the specified action(s) may be considered to be a part of the map.

The task performed by the user to identify every target that needs to be monitored may become tedious, especially when there is a very large number of potential targets. Also, such a task may need to be repeated every time a new map with multiple rules is created. In addition, if new targets of interest appear in the monitoring domain, they may need to be manually identified by the user, so that the user can associate the new targets with the map, before these new targets can be monitored. Accordingly, it may be desirable to provide an automatic target selection for the user. In some embodiments, such may be accomplished by the fabric manager 100 that automatically selects certain targets for a user. During use, a target selection module in the fabric manager 100 determines targets for a user based on a filter map of one or more filter rules provided by the user. A target in this context may be a VM, a vNIC, or any of other components having packets that are desired to be monitored.

In some cases, the fabric manager 100 providing the automatic target selection may be implemented using software that is run on a device. In such cases, the device running the automatic target selection software becomes a specialized device. By means of non-limiting examples, the device may be a computer, a laptop, a server, a tablet, an iPad, a phone, a network device, or any of other devices that is capable of performing communication.

Figure 7:
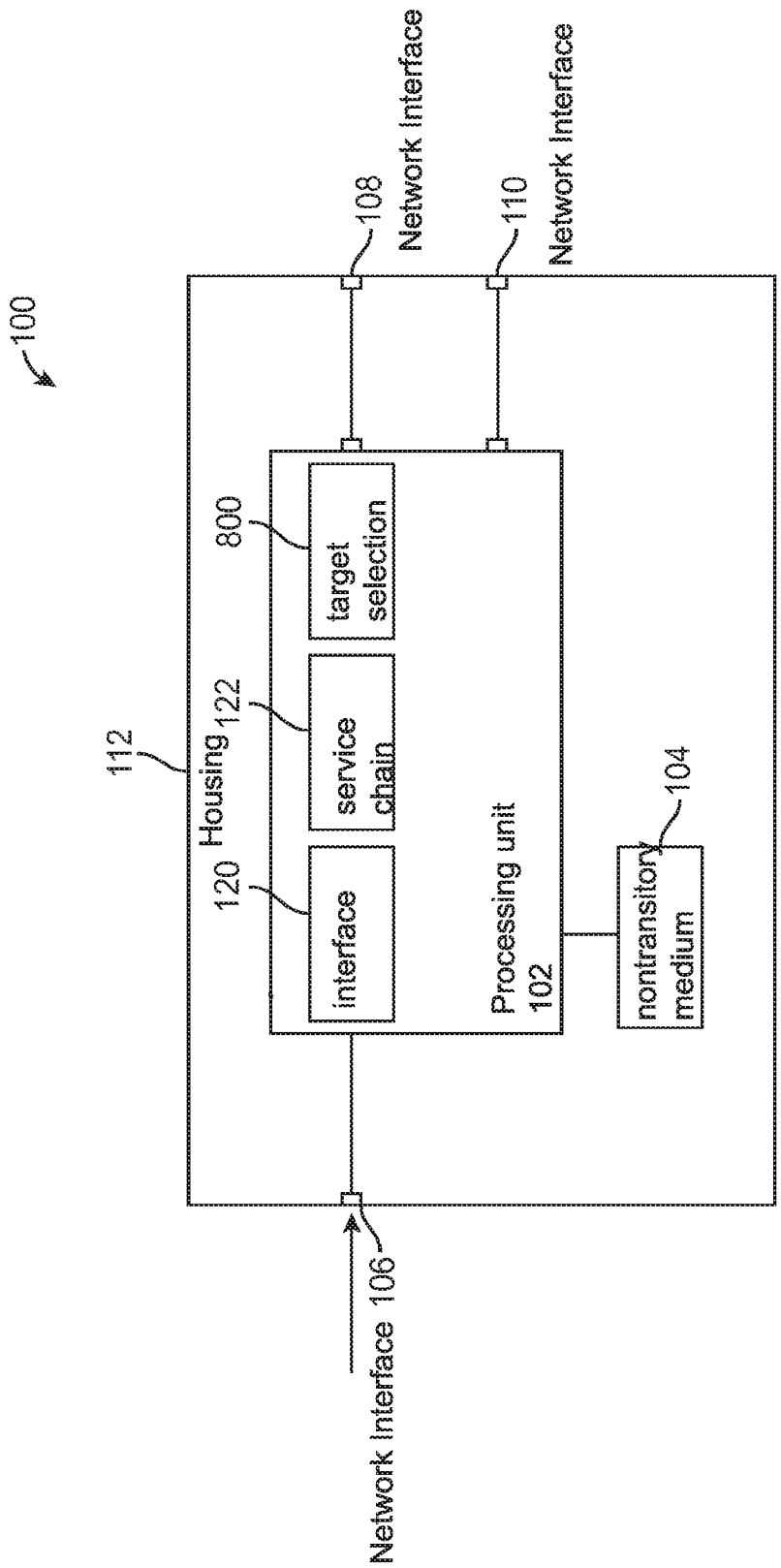
FIG. 7 illustrates a fabric manager that includes a target selection module in accordance with some embodiments.

FIG. 7 illustrates a fabric manager 100 that is configured to provide automatic target selection. As shown in the figure, the fabric manager 100 includes a processing unit 102 and a non-transitory medium 104 communicatively coupled to the processing unit 102. The fabric manager 100 also includes a communication interface 106 for receiving information from a user. In other cases, there may be multiple communication interfaces for receiving information from multiple users. The fabric manager 100 also includes a network interface 108 configured to communicate with a controller (e.g., the SDN controller 22), and a network interface 110 configured to communicate with a network device (e.g., the network device 18). Although only one network interface 108 and one network interface 110 are shown, in other examples, the fabric manager 100 may include multiple network interfaces 108 for communicating with multiple controllers 22, and/or multiple network interfaces 110 for communicating with multiple network devices 18. In other embodiments, two or more of the network interfaces 106, 108, 110 may be combined and be implemented as a single network interface. In the illustrated example, the processing unit 102 and the non-transitory medium 104 are accommodated in a housing 112 of the fabric manager 100. The housing 112 allows the fabric manager 100 to be carried, transported, sold, and/or operated as a single unit. Alternatively, the non-transitory medium 104 may be external to the housing 112. For example, the non-transitory medium 104 may be one or more storages/databases that are communicatively coupled to the processing unit 102. The network interfaces 106, 108, 110 are located at a periphery of the housing 112. In other embodiments, the network interfaces 106, 108, 110 may be located at other locations relative to the housing 112. In some cases, the fabric manager 100 may be integrated with a controller, such as the controller 22 (which may be a SDN controller in some embodiments).

The processing unit 102 may be implemented using an integrated circuit, such as a processor. A processor may be a general processor, a network processor, an ASIC processor, a FPGA processor, etc. In other embodiments, the processing unit 102 may be a field processor. In further embodiments, the processing unit 102 may be a network card. In some cases, the processing unit 102 may be implemented using hardware, software, or a combination of both.

As shown in the figure, the fabric manager 100 includes a user interface module 120, a target inventory accessing module 122, and a target selection module 800. The user interface module 120 is configured to provide a user interface for allowing a user of the fabric manager 100 to enter inputs. The inputs may be a filter map having one or more filter rules, wherein a filter rule may have one or more filtering components. The non-transitory medium 104 is configured to store the user-defined filter map.

The target inventory accessing module 122 is configured to access a list of available targets. In some embodiments, the identifiers of the available targets may be stored in a medium, e.g., the medium 104. In such cases, the target inventory accessing module 122 may be configured to communicate with the medium 104 for accessing the list of available targets. In the illustrated embodiments, the target inventory accessing module 122 is shown as a separate module from the target selection module 800. In other embodiments, the target inventory accessing module 122 may be implemented in, or as a part of, the target selection module 800.

The target selection module 800 is configured to automatically select certain targets for a user based on the inputs entered by the user. In the illustrated embodiments, the target selection module 800 is configured to infer targets to be monitored from the specified filter rule(s) defined by the user. The target selection module 800 operates on the idea that only those targets whose ingress/egress traffic can potentially result in a match with the user-defined filter rule(s) in a map need to be monitored (while the remaining targets may be ignored). The target selection process therefore involves deriving the set of all such targets for a given map.

In some cases, a user may define a set of filter rules that make up a map, with each filter rule having one or more filtering components. The target selection module 800 then searches all available targets in the inventory, and determines those that satisfy the filter rules for the given map.

In one implementation, the target selection module is configured to select the one or more targets from the list of available targets based on:

$$C = \begin{cases} \text{subset of } V \text{ associated with local} \\ L1 - L3 \text{ filter component (if specified)}, \\ V \end{cases}$$

$$R = \bigcap_{i=1}^{m} C_i, \text{ and}$$

$$F = \bigcup_{j=1}^{n} R_j$$

wherein V represents the list of available targets.

As shown in the above algorithm, if the user does not define any filters, then the target selection module 800 may select the universal set V that includes all targets within the monitoring domain currently listed in the inventory as the set C of targets. If filter components are specified, the target selection module 800 then determines a subset of the universal set V of targets that satisfies the specified filter components.

Because a filter (rule) has m number of filter component(s), the target selection module 800 will determine a set R of target(s) that satisfies all of the filter component(s) in that filter rule (because all m number of filter component(s) in a filter rule must be satisfied simultaneously), as follows:

$$R = \bigcap_{i=1}^{m} C_i$$

Also, for a filter map that has n number of filter rule(s), the target selection module 800 will determine a set F of target(s) that includes any target that satisfies any of the n filter rule(s) (because a map is considered to have a match if any of its filters (filter rules) has a match) as follows:

$$F = \bigcup_{j=1}^{n} R_j.$$

In some cases, the user may have the option to guide the automatic target selection process, if desired. In particular, the user interface module 120 may be configured to provide a user interface for allowing a user of the fabric manager 100 to enter an inclusion set having targets that are to be included, and/or an exclusion set having targets that are to be excluded. The information regarding the inclusion set and/or the exclusion set may be stored in the medium 104. The inclusion set contains only those targets that should be considered by automatic target selection module 800. The user may define the inclusion set by identifying specific targets or by using an appropriate filter. Inclusion set(s) may be stored in the non-transitory medium 104 for later use. In one implementation, the inclusion set I may be defined as:

$$I = \begin{cases} \text{targets to be included (if specified)} \\ V(\text{otherwise}) \end{cases}$$

The exclusion set contains targets that should not be considered by automatic target selection module 800. The user may define the exclusion set by identifying specific targets or by using an appropriate filter. Exclusions set(s) may be stored in the non-transitory medium 104 for later use. In one implementation, an exclusion set E may be defined as:

$$E = \begin{cases} \text{targets to be excluded (if specified)} \\ \emptyset(\text{otherwise}) \end{cases}$$

The final target set T for a map may be based on the set of targets that satisfy the map, the inclusion set I, and the exclusion set E, as follow: T=(F∩I)−E.

In some cases, the processing unit 102 may be configured for: obtaining information regarding an inclusion set; and determining a second set of targets based on the information regarding the inclusion set. The processing unit may also include an inclusion set integrator configured to integrate information regarding an inclusion set in the process of determining the list of targets. In one implementation, the inclusion set integrator is configured to provide a "∩" (intersection) function and to determine the set of one or more targets based on: (the first set of targets in set F)∩(the second set of targets from the inclusion set).

Also, in some cases, the processing unit 102 may be configured for: obtaining information regarding an exclusion set; and determining a third set of targets based on the information regarding the exclusion set. The processing unit may also include an exclusion set integrator configured integrate information regarding an exclusion set in the process of determining the list of target. In one implementation, the exclusion set integrator is configured to provide a "−" (difference) function. The inclusion set and exclusion set integrators are configured to determine the set of one or more targets based on: ((the first set of targets in set F)∩(the second set of targets form the inclusion set))−(the third set of targets from the exclusion set).

Figure 8:
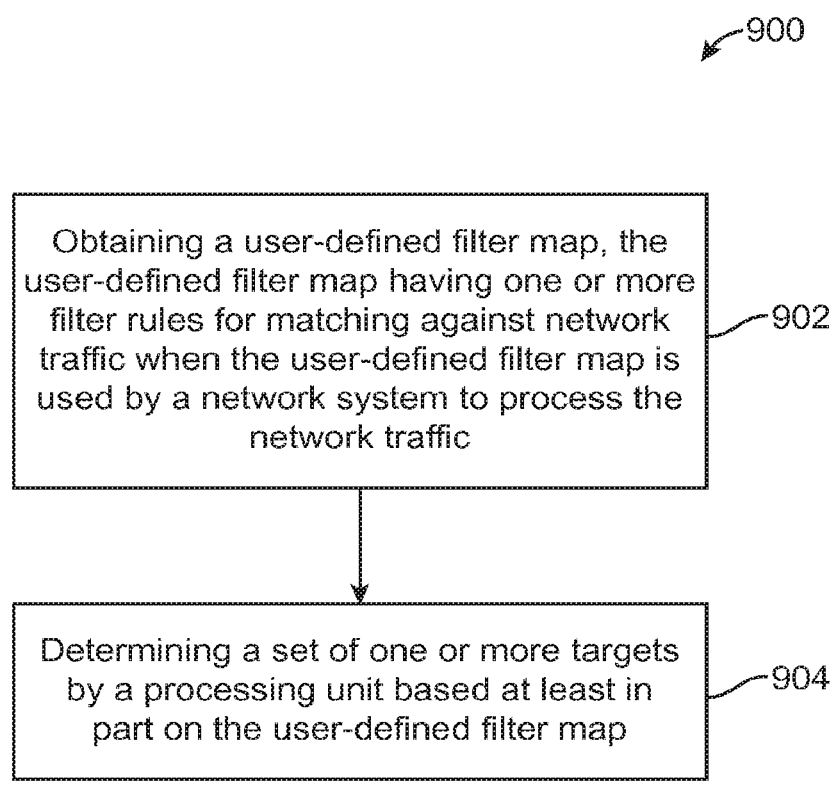
FIG. 8 illustrates a method of identifying targets for a network system.

FIG. 8 illustrates a method 900 of identifying targets for monitoring. The method 900 may be performed by the processing unit 102 of FIG. 7. First, a user-defined filter map is obtained (item 902). The user-defined filter map may have one or more filter rules for matching against network traffic when the user-defined filter map is used by a network system to process the network traffic. A filter rule may have one or more filter component(s). For example, a filter component may be a L1 filter component (e.g., switch port), a L2 filter component (e.g., MAC address, VLAN identifier, ethertype, etc.), a L3 filter component (e.g., IP address), or any combination of the foregoing. Thus, a filter component may include information regarding switch port, MAC address, VLAN identifier, ethertype, IP address, or any combination of the foregoing. In some cases, only local L1-L3 filter components are considered when looking for potential targets because remote filter components may not be associated with a desired monitoring domain (e.g., a local monitoring domain). In some cases, item 902 may be performed by the processing unit 102 retrieving a map having one or more user-defined filter rules stored in a non-transitory medium (e.g., the medium 104). In other cases, item 902 may be performed by the processing unit 102 receiving an input from a user that defines one or more filters in a map.

Next, a set of one or more targets is determined by the processing unit 102 based at least in part on the user-defined filter map (item 904). In some cases, the processing unit 102 is configured to access a list of available targets from a database, and select the one or more targets from the list of available targets based at least in part on the user-defined filter map. The database may be a medium in the fabric manager 100 or one or more media that is communicatively coupled to the fabric manager 100. Also, in some embodiments, item 904 may be performed before the network system uses the user-defined filter map to process the network traffic.

In some cases, the act of determining the set of one or more targets comprises determining a first set of targets by the processing unit 102 that are possible source(s) and/or recipient(s) of packets satisfying the user-defined filter map. For example, the user-defined filter map includes a first filter rule having first multiple filter components, and wherein the act of determining the set of one or more targets comprises determining a first set R1 of targets by the processing unit 102 that are possible source(s) and/or recipient(s) of packets satisfying all of the first multiple filter components of the first filter rule. The user-defined filter map may include a second filter rule having second multiple filter components, and wherein the act of determining the set of one or more targets further comprises determining a second set R2 of targets by the processing unit 102 that are possible source(s) and/or recipient(s) of packets satisfying all of the second multiple filter components of the second filter rule. The filter set F of targets can be determined based on $$F = \bigcup_{j=1}^{n} R_j$$

which is R1∪R2 (i.e., union of R1 and R2) in the above example.

In some cases, the method 900 may further include obtaining information regarding an inclusion set, and determining a second set of targets based on the information regarding the inclusion set, wherein the set of one or more targets is determined based on: (the first set of targets from set F)∩(the second set of targets from the inclusion set).

Also, in some cases, the method 900 may further include obtaining information regarding an exclusion set, and determining a third set of targets based on the information regarding the exclusion set, wherein the set of one or more targets is determined based on: ((the first set of targets from set F)∩(the second set of targets from the inclusion set))–(the third set of targets from the exclusion set).

In some cases, the obtained user-defined filter map comprises a newly created filter rule, and the act of determining the set of one or more targets is performed by the processing unit 102 in response to the newly created filter rule. Also, in some cases, the obtained user-defined filter map comprises a modified filter rule resulted from a modification of an existing filter rule, and the act of determining the set of one or more targets is performed by the processing unit 102 in response to the modified filter rule. In some embodiments, the processing unit may include a detection module for detecting the newly created filter rule and/or the modified filter rule.

FIG. 9 illustrates an example of the automatic target selection technique described. In the illustrated example, the user has defined two filters: "IP_src=172.26.0.0/16, IP_dst=*" and "IP_src=*, IP_dst=172.26.0.0/16" corresponding to bi-directional network traffic direction. These filters are for capturing packets that travel to, or travel from, certain target(s). In the above filter definitions, a "0" in the filter component denotes a wildcard. So, "172.26.0.0/16" will cover any of the targets 172.26.1.0, 172.26.2.0, . . . 172.26.9.0 to the extent that they are available in the inventory. In the illustrated example, the user has also defined an inclusion set I to be I=(172.16.1.0/24, 172.26.1.0/24, 172.26.2.0/24), and an exclusion set E to be E=(172.26.1.2, 172.26.1.3). The above user inputs may entered using the interface provided by the user interface module 120, and may be stored in the non-transitory medium 104 of the fabric manager 100.

As shown in FIG. 9, all available targets in an inventory may be represented as V=(172.0.0.0/8). In some cases, the inventory of targets may be created and updated automatically in response to a user adding, removing, and/or relocating a target. For example, a new vNIC may be added to the network, and the VM (e.g., VM 16) and/or the host (e.g., host 12) associated with the newly added vNIC may contain information regarding the new vNIC. In some cases, the fabric manager 100 may be configured to periodically communicate with the VM and/or the host to see if there is any change to the targets. If a target is added, is removed, or relocated, the fabric manager 100 then updates the targets inventory accordingly. In other cases, the VM 16, the host 12, or a controller coupled to the host 12, may be configured to automatically inform the fabric manager 100 if there is any change to the target(s), and the fabric manager 100 will automatically update the targets inventory accordingly.

In the illustrated example, among all of the available targets in the V set, only a subset F of targets satisfies the two user-defined filters. In the illustrated example, the processing unit 102 of the fabric manager 100 determines that the targets in the subset F satisfying the two user-defined filters include 172.26.1.0/24, 172.26.2.0/24, and 172.26.3.0/24. However, because the inclusion set I defined by the user does not include 172.26.3.0/24, only 172.26.1.0/24 and 172.26.2.0/24 are included based on F∩I, and the remaining set includes 172.26.1.0/24 (which covers 172.26.1.1, 172.26.1.2, 172.26.1.3, 172.26.1.4 in the inventory) and 172.26.2.0/24 (which covers 172.26.2.1, 172.26.2.2, 172.26.2.3 in the inventory). Also, because the exclusion set E defined by the user includes 172.26.1.2 and 172.26.1.3, these two targets are excluded based on (F∩I)–E. The final target set T includes only 172.26.1.1, 172.26.1.4, 172.26.2.1, 172.26.2.2, and 172.26.2.3.

As shown in the above examples, the target selection module 800 is advantageous because it provides a fully automated selection of the relevant targets that need to be monitored. The target selection module 800 also allows the user to guide the selection process so that the target selection may be semi-automatic. The target selection process ensures that only the relevant targets (whose ingress/egress network traffic can potentially match rules in the map) are selected for monitoring. The target selection module 800 is also advantageous because it allows detection of new targets and modifications to existing targets, and may update the set of selected targets accordingly. For example, if the target selection module 800 determines that a newly added target satisfies a user-defined map, and the inclusion set I and the exclusion set E defined by the user, the target selection module 800 may automatically update the set of selected targets to include the newly added target. As another example, if a previous target has been removed, the target selection module 800 may detect such removal of the target, and may automatically update the set of selected targets determined previously. In some cases, any change in the inventory of targets (e.g., addition of a new target, removal of a previous target, etc.) may trigger the target selection module 800 to update the set of selected targets determined previously. Also, in some cases in which the user supplied inclusion and exclusion sets are incompatible with the target set derived from the user-defined map, the fabric manager 100 may flag a warning. In the manual target selection technique, such incompatibilities cannot be easily detected.

(III) In-Fabric Traffic Analysis Using Automatically Created Derivative Filters

A. Overview of in-Fabric Traffic Analysis

Two main components of a network traffic monitoring ecosystem are targets and tools. A target may be a host within a datacenter or a node in the network that is being monitored. A tool is an appliance, which may be highly specialized, used for analyzing network packets. A third component, the visibility fabric, provides a mechanism for directing specific slices of network traffic associated with the targets, toward the desired tools. The visibility fabric is made up of multiple nodes, each capable of providing some degree of filtering, packet manipulation, and packet forwarding services. The targets, tools, and fabric service nodes may be physical machines or virtual machines. It should be noted that "true" visibility is achieved only when the traffic gets analyzed. The task of analyzing network traffic is performed by the tools, which make them a necessary component of the ecosystem. The fabric plays an important, albeit, supportive role of feeding the tools with the right content, in an efficient and intelligent manner.

In-fabric Traffic Analysis (IFTA) is a method for conducting network traffic analysis completely within the visibility fabric. It is designed to shed light on the traffic patterns of selected targets, based on specified criteria. To initiate an analysis session using IFTA, a user first defines high-level filters to indicate interest in a particular selection of network traffic. The IFTA capable visibility fabric then provides suitable analytics for the subset of the network within the monitoring domain that is covered by those user defined high-level filters.

IFTA relies on the existence of one or more software defined network (SDN) capable service nodes in the visibility fabric for running the IFTA algorithm. Software defined visibility fabric for network monitoring will be described below. The operational tasks involved in IFTA are as follows:

1. Monitoring Targets: Network traffic monitoring is enabled for all targets in the visibility domain that are affected by the user specified high-level filters. The user may manually identify all affected targets, or alternatively, affected targets may be automatically determined. Automatic target selection technique will be described in detail below. The monitored traffic is directed toward appropriate fabric service nodes that are participating in IFTA.

2. Filter Refinement: The original high-level filters get dynamically transformed over time into a rich assortment of fine-grained filters, which are distributed across the IFTA service nodes.

3. Statistics Extraction and Analysis: Filter match statistics are extracted from the IFTA service nodes on a periodic basis by a fabric manager and are analyzed to provide insight into the traffic patterns of the local network topology under scrutiny.

1. Automatic Filter Generation

IFTA involves the generation of new filters. This is the process of spawning new filters when a network packet matches an existing filter. In one implementation, such may be accomplished by associating the original filter with a 'forward to controller' action. In such case, when a packet arriving at a switch in the visibility fabric matches the original filter, the packet is then forwarded from the switch to a controller (e.g., SDN controller). When the controller receives the forwarded packet, it will construct new filters, based on specific logic, and deploy them to the desired components in the visibility fabric. One way to speed up the process is to truncate the packet before sending it to the controller (e.g. only deliver headers instead of the full payload). Another way to speed up the process is to use certain SDN switches (e.g., Open vSwitch) that support "learn" actions. These switches may be configured to create new filters. Their use helps eliminate the switch-to-controller and back round-trip.

The created filters are placed in one or more components (P0 node, P1 node, P2 node, or a combination thereof) in the visibility fabric. In this context, the service nodes function as switches that utilize the filters for packet matching. In some cases, the filters may be placed in one single service node. In other cases, the filters may be placed in multiple service nodes for scaling and reliability purposes.

2. Filter Tree

One way to provide different visibility resolutions through the visibility fabric is to utilize finer-grained filters that are derived from the original high-level filters provided by the user. These derivative filters are dynamically created using an automatic filter generation process. The derivative filters can be organized as a tree data-structure in which (1) the root node of the tree comprises high-level filter(s) provided by user(s), (2) nodes at each successive level of the tree provide finer grades of filtration, and (3) the leaf nodes of the tree are made up of individual target filters. The filter tree is a topological representation of a subset of the local network that is covered by the user specified high-level filters.

The filter tree is spread out across multiple fabric service nodes, each instantiating a portion of it. Packets traversing down the tree hierarchy are forwarded from one service node to another using appropriate IP tunneling technology. The distributed filter tree is advantageous because it is highly scalable. In particular, because the filter tree is spread out across multiple services nodes in the fabric, it is a very scalable solution. In some cases, large filter trees can be created that exceed the resource capacity of individual fabric service nodes. The filter tree is also reliable because a failure of an individual fabric service node will not result in losing the entire filter tree. Also, the filter tree allows comparison and analysis to be performed for certain interested group. For example, a user may specify a filter for the root node to monitor packets at only HR subnet, etc. In such example, a filter tree would be created for this specified interested group.

In some embodiments, a tree (local tree) may be generated for a local side. In other embodiments, a similar tree (remote tree) may be generated for the remote side.

3. Analytics Based on Filter Match Statistics

During the IFTA process, packets enter a filter tree at the root node and exit from a leaf node. As they percolate down the hierarchy, the respective root-to-leaf journeys are recorded because of updates to filter match statistics occurring at each of the nodes that were visited. The collection of filter match statistics in a filter tree is a rich source of machine generated data that is structurally organized to offer varying levels of insight into the traffic patterns of the local network in relation to some user specified criteria. The leaf nodes have information on the individual targets that are being monitored. Higher level nodes within the tree may contain aggregate information on various types of network organizational structures (VLANs, subnets, protocols, etc). The root node provides a consolidated summary of the environment under study.

4. Advantages of IFTA

IFTA brings the visibility fabric to the forefront, where it can provide analytics regarding the network packets, even in the absence of tools. This is unlike some existing network monitoring systems, in which the visibility fabric serves one primary purpose of delivering network packets to tools. In these existing network monitoring systems, it is the tools that are providing 'true' visibility, while the fabric is relegated to a supporting role in the overall traffic monitoring ecosystem.

IFTA does just the right amount of filtration, statistics updating, and forwarding, that are required to cover the subset of the network specified by the user (using high-level filters). Accordingly, the IFTA it is a very efficient traffic analysis solution. Furthermore, because the visibility fabric is logically located closer to the targets as compared to traditional network monitoring tools, it also consumes less network resources.

B. Detail Description of in-Fabric Traffic Analysis

In a traffic production network, packets are transmitted from one node to another node that is the intended recipient of the packets. In some cases, certain targets in the traffic production network may be monitored using a network monitoring system that communicatively coupled to the traffic production network. The network monitoring system is configured to obtain packets from the traffic production network, and transmit them to one or more tools for analysis. Thus, the network monitoring system does not participate in the network traffic production.

In a network monitoring system, the fabric regulating the network components in the network monitoring system are mainly configured to provide delivery of network packets to tools. A target may be a host or a node in the network that is being monitored. A tool may be an appliance that is specialized for analyzing network packets. The fabric (visibility fabric) is made up of multiple nodes, each capable of providing some degree of packet filtering, packet manipulating, and packet forwarding services. The fabric provides a mechanism for directing specific slices of network traffic, associated with the targets, toward the desired tools. The targets, tools and fabric service nodes may be physical machines or virtual machines. After the fabric provides delivery of network packets to the tools, the tools then analyze the packets to provide "visibility" of the network being monitored. Thus, the fabric is relegated to a supporting role in the overall traffic monitoring system. It should be noted that in such a system, network visibility is achieved only after the network traffic is delivered to the end tools and after the end tools analyze the network traffic. Accordingly, the tools are necessary components in such a network monitoring system, while the fabric plays a supportive role of feeding the tools with the right content. However, in some cases, it may be desirable to provide network traffic analysis within the fabric so that network visibility may be achieved using the fabric. In such a system, the end tools may not be required, but they may also be included in the system.

In accordance with some embodiments, a method of conducting network traffic analysis is achieved within the visibility fabric (auxiliary network). Such technique provides visibility on the traffic patterns of selected targets based on certain criteria provided by a user. To initiate an analysis session, a user first defines high-level filter(s) to indicate interest in a particular selection of network traffic. An in-fabric traffic analysis (IFTA) engine then provides suitable analytics for the subset of the network within the monitoring domain covered by the user-defined filter(s). The IFTA engine includes an IFTA algorithm configured to perform various tasks, including but not limited to derivative filters generation and statistics extraction. In some cases, the IFTA engine relies on the existence of one or more service nodes in the visibility fabric (the auxiliary network) for running IFTA algorithm. Thus, the IFTA engine may be implemented using one or more service nodes that are parts of the auxiliary network. Also, in some cases, the IFTA engine (or at least a portion of it) may be implemented using a fabric manager. All (visibility fabric) service nodes are able to perform some degree of (1) packets filtering, (2) packets manipulation, and (3) packets forwarding. The service nodes may include P0 node(s) representing host-level virtual switch(es), P1 node(s) representing VM(s) (e.g., virtual monitoring appliance(s)), P2 node(s) representing physical network device(s) (e.g., physical monitoring appliance(s)), or any combination of the foregoing. In other cases, the service nodes may be other types of nodes, and may be physical appliances or virtual machines.

It should be noted that for the IFTA process, there need to be at least one service node in the auxiliary network that participates in the IFTA process. In some cases, all service nodes may participate in the IFTA process. In other cases, not all nodes are IFTA nodes. In such cases, only the service node(s) that is IFTA node(s) is selected for the IFTA process. For example, in one implementation, the service chain creation technique described previously may be used to chain one or more IFTA capable node(s).

In some cases, the IFTA engine is configured to perform the following tasks: (1) target(s) monitoring, (2) derivative filter(s) generation, and (3) statistics extraction and analysis.

In target(s) monitoring, the user first specifies high-level filter(s). In some cases, the user also manually identifies all targets that are desired to be monitored. In other cases, the automatic target selection technique described above may be used to automatically select a set of targets. After the high-level filter(s) and the set of targets have been determined, the IFTA engine then monitors the network traffic as it is directed towards appropriate fabric service nodes in the auxiliary network.

In derivative filter(s) generation, the IFTA engine obtains the original high-level filter(s) defined by the user. The IFTA engine then dynamically creates derivative filters when network packets match the original user-defined high level filter(s). These derivative filters, which are finer-grade than the original filter(s), are placed on service nodes (e.g., P0 service node, P1 service node, P2 service node, etc.). In some cases, the filters may be placed in multiple service nodes for scaling and reliability purposes.

In statistics extraction and analysis, the IFTA engine extracts filter match statistics from the service nodes on a periodic basis. In some cases in which part of the IFTA engine is implemented in a fabric manager, the fabric manager may extract the filter match statistics from the service nodes, and may analyze the statistics to provide visibility into the traffic patterns of the local network topology being monitored.

In some cases, in addition to, or instead of, monitoring a local network, the above technique may be used to monitor a remote network. In such cases, a similar tree (remote tree) may be generated for the remote side, and filter match statistics from the remote side may be generated and collected in a similar fashion.

In some cases, the fabric manager 100 may be implemented using software that is run on a device. In such cases, the device running the IFTA software becomes a specialized device. By means of non-limiting examples, the device may be a computer, a laptop, a server, a tablet, an iPad, a phone, a network device, or any of other devices that is capable of performing communication.

Figure 10:
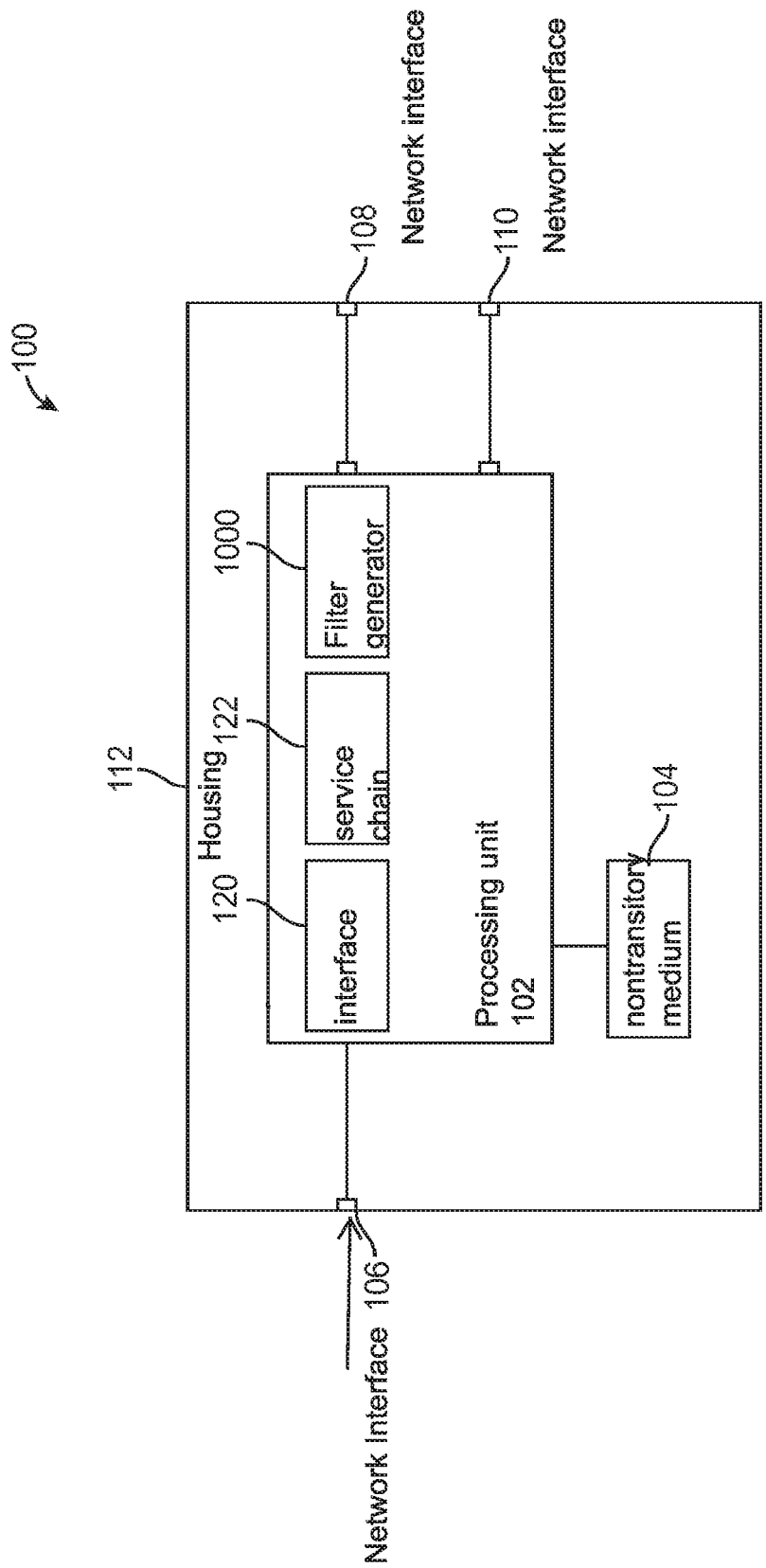
FIG. 10 illustrates a fabric manager that includes an automatic filter generation module in accordance with some embodiments.

FIG. 10 illustrates a fabric manager 100 that is configured to provide automatic filter generation. The fabric manager 100 may be used to implement the IFTA engine, or at least a part of the IFTA engine. The fabric manager 100 is the same as that shown in FIG. 3, except that the fabric manager 100 further includes an automatic filter generation module 1000. Optionally, the fabric manager 100 may also include an automatic target selection module 800, like that shown in FIG. 7. As shown in FIG. 10, the fabric manager 100 includes a processing unit 102 and a non-transitory medium 104 communicatively coupled to the processing unit 102. The fabric manager 100 also includes a network interface 106 for receiving information from a user. In other cases, there may be multiple network interfaces 106 for receiving information from multiple users. The fabric manager 100 also includes a network interface 108 configured to communicate with a controller (e.g., the SDN controller 22), and a network interface 110 configured to communicate with a network device (e.g., the network device 18). In other cases, the fabric manager 100 may be implemented in a controller (e.g., the SDN controller 22). In such cases, the network interface 108 may not be needed. In further cases, the fabric manager 100 may be implemented in a switch. Although only one network interface 108 and one network interface 110 are shown, in other examples, the fabric manager 100 may include multiple network interfaces 108 for communicating with multiple controllers 22, and/or multiple network interfaces 110 for communicating with multiple network devices 18. In the illustrated example, the processing unit 102 and the non-transitory medium 104 are accommodated in a housing 112 of the fabric manager 100. The housing 112 allows the fabric manager 100 to be carried, transported, sold, and/or operated as a single unit. Alternatively, the non-transitory medium 104 may be external to the housing 112. For example, the non-transitory medium 104 may be one or more storages/databases that are communicatively coupled to the processing unit 102. The network interfaces 106, 108, 110 are located at a periphery of the housing 112. In other embodiments, the network interfaces 106, 108, 110 may be located at other locations relative to the housing 112. In some cases, the fabric manager 100 may be integrated with or implemented in a controller, such as the controller 22 (which may be a SDN controller in some embodiments). In other cases, the fabric manager 100 may be integrated with or implemented in a switch. In further cases, the fabric manager 100 may be communicatively coupled to a controller or to a switch.

The processing unit 102 may be implemented using an integrated circuit, such as a processor. A processor may be a general processor, a network processor, an ASIC processor, a FPGA processor, etc. In other embodiments, the processing unit 102 may be a field processor. In further embodiments, the processing unit 102 may be a network card. In some cases, the processing unit 102 may be implemented using hardware, software, or a combination of both.

As shown in the figure, the processing unit 102 includes a user interface module 120 configured to provide a user interface for allowing a user of the fabric manager 100 to enter inputs. The inputs may include a filter having one or more filtering components. In other cases, the inputs may include multiple filters that belong to a map. The non-transitory medium 104 is configured to store the user-defined filter(s).

The automatic filter generation module 1000 is configured to automatically generate derivative filters based on the inputs entered by the user. In the illustrated embodiments, the processing unit 102 (i.e., the automatic filter generation module 1000 in the processing unit 102) is configured to receive an indication that a packet matches a user-defined filter, and create one or more derivative filters using an automatic filter generation module. In some cases, the automatic filter generation module 1000 is configured to dynamically create the one or more derivative filters based at least in part on the received indication. In one implementation, the indication may be a copy of the packet matching the filter. To increase efficiency, the packet may be truncated before sending it to the automatic filter generation module 1000 (e.g. so that only the header is sent, instead of the full payload). The first derivative filter may provide a finer grade of filtration compared to the user-defined filter. In some cases, the derivative filter(s) may be stored in the non-transitory medium 104. Also, in some cases, the derivative filter(s) may be applied (e.g., stored) in one or more service nodes controlled by the fabric manager 100. For example, the automatic filter generation module 1000 may apply the derivative filter(s), either directly or indirectly through a switch or controller, to one or more service nodes, such as the host level virtual switch 11, the VM 16 (e.g., virtual monitoring appliance), the physical network device 18 (e.g., physical monitoring appliance), etc. This allows the derivative filter(s) to capture additional packets at the service node(s) for creating network statistics.

In some embodiments, the fabric manager 100 may be implemented in a SDN switch (e.g., Open vSwitch) that supports "learn" actions. In such cases, the learn actions may be used by the switch to create the new derivative filters. Such technique helps eliminate the switch-to-fabric manager (or switch-to-controller in situation in which the fabric manager 100 is implemented or integrated with the controller) communication that is involved in the transmission of packet matching indication and the transmission of derivative filters.

In the above embodiments of FIG. 10, the fabric manager 100 is illustrated as having the service chain creation module 122 and the filter creation module 1000. In other embodiments, the fabric manager 100 may not include the service chain creation module 122. Also, in other embodiments, the fabric manager 100 may include the target selection module 800, or both the target selection module 800 and the service chain creation module 122.

Figure 11A:
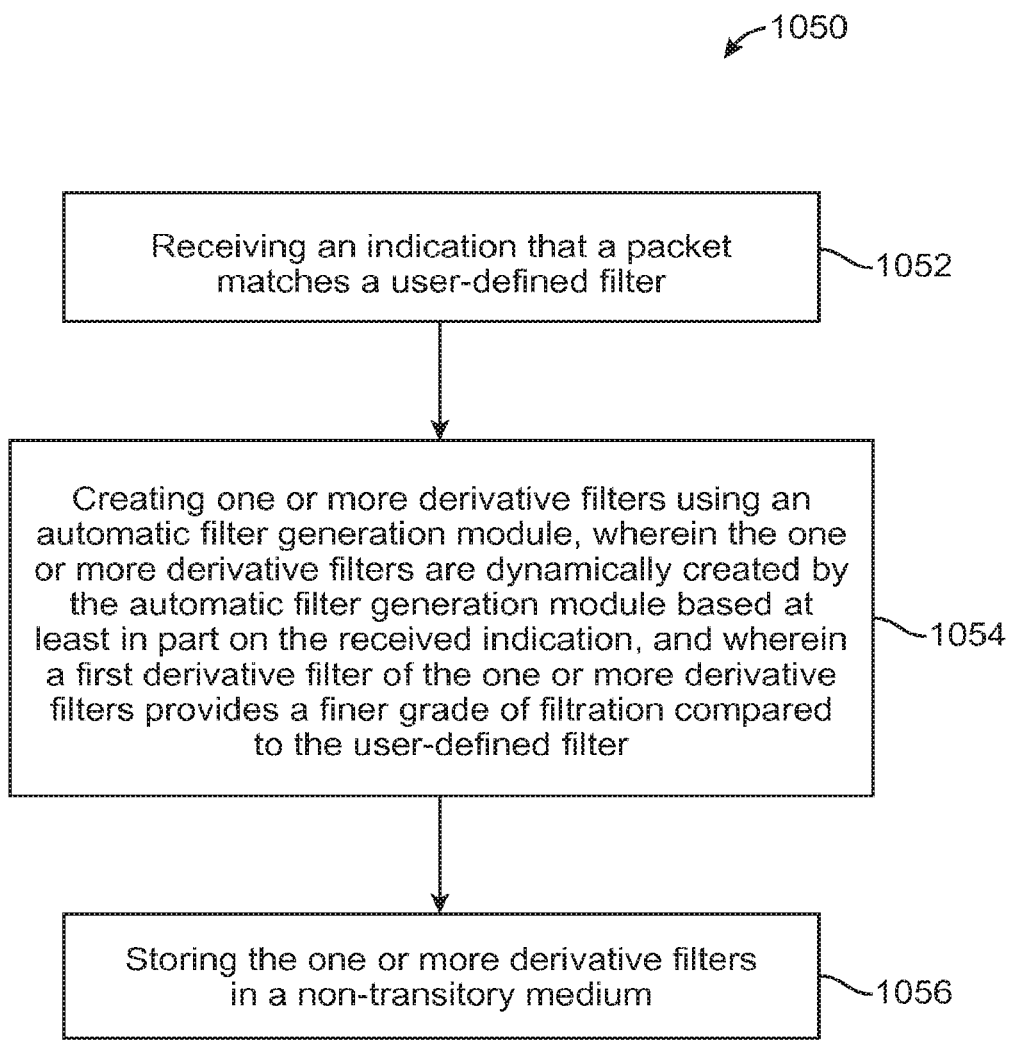
FIG. 11A illustrates a filter generation method.

FIG. 11A shows a filter generation method 1050 for an auxiliary network in accordance with some embodiments. For the method 1050, there need to be at least one service node that participates in the IFTA process. In some cases, all service nodes may participate in the IFTA process. Thu, all service nodes may be IFTA nodes. In other cases, not all nodes are IFTA nodes. In such cases, only the service node(s) that is IFTA node(s) is selected for the IFTA process. For example, in one implementation, the service chain creation technique described previously may be used to chain one or more IFTA capable node(s). Such can be accomplished using the service chain creation module 122 described previously. Also, it should be noted that the service node(s) for the IFTA process can do the following: (1) packets filtering, (2) packets manipulation, and (3) packets forwarding. The amount of filtering and/or manipulation is not limited to having L1-L3, and can span to L4 and above.

As shown in FIG. 11A, the method 1050 includes receiving an indication that a packet matches a user-defined filter (item 1052). The user-defined filter is for monitoring certain target(s). In some embodiments, the target(s) may be selected by the user. In other embodiments, if the fabric manager 100 includes the target selection module 800, the target(s) selection may be performed automatically by the target selection module 800. In some cases, item 1052 may be performed by the fabric manager 100, which receives the indication from a service node (e.g., a service node P0, P1, or P2, etc). The fabric manager 100 may be implemented in or integrated with a controller (e.g., a SDN controller). In other cases, the fabric manager 100 may be implemented in or integrated with a switch. In further cases, the fabric manager 100 may be communicatively coupled with a controller or a switch. Also, in some cases, the indication may comprise a truncated packet that is truncated from the packet matching the user-defined filter. In such cases, the first derivative filter may be dynamically created by the automatic filter generation module 1000 based on the truncated packet.

Next, the automatic filter generation module 1000 creates one or more derivative filters, wherein the one or more derivative filters are dynamically created by the automatic filter generation module 1000 based at least in part on the received indication (item 1054). The derivative filter(s) may include a first derivative filter that provides a finer grade of filtration compared to the user-defined filter. In some cases, the derivative filters may include a second derivative filter that provides a finer grade of filtration compared to the first derivative filter. In some cases, the automatic filter generation module 1000 is configured to dynamically create the first derivative filter in response to the packet matching the user-defined filter. Also, in some cases, the automatic filter generation module 1000 may be configured to dynamically create the second derivative filter.

It should be noted that the number of derivative filters is not limited to two, and may be any number depending on a topology of the network being studied and the kind of analyses (e.g., a desired level of visibility) a user is requesting.

After the derivative filter(s) is generated, the derivative filter(s) will then be stored in a non-transitory medium (item 1056). In the illustrated embodiments, the derivative filter(s) are stored in a service node. This allows the derivative filter at the service node to capture additional packets travelling to the service node that meet the derivative filter, and allows statistics to be created to reflect the captured packets. In particular, if the service node receives a packet that meets the derivative filter, the service node can then update a counter to reflect the event.

It should be noted that the network traffic needs to be directed to the service node(s) at which the root filter and the derivative filter(s) reside. In particular, traffic associated with the monitored targets needs to pass through all of the filters for that particular target (i.e., from root to leaf). In one implementation, the fabric manager is used to create a service chain that connects the IFTA service nodes in such a way that every packet matching the root-filter will pass through all of the derivative filters, so that it comes out finally at a leaf node.

In other embodiments, the created derivative filter(s) may be stored in multiple (e.g., all) service nodes that are participating the IFTA for reliability and redundancy purposes. Optionally, the derivative filter(s) and the original filter may also be stored in the non-transitory medium 104 of the fabric manager 100, but such is not required.

Figure 11B:
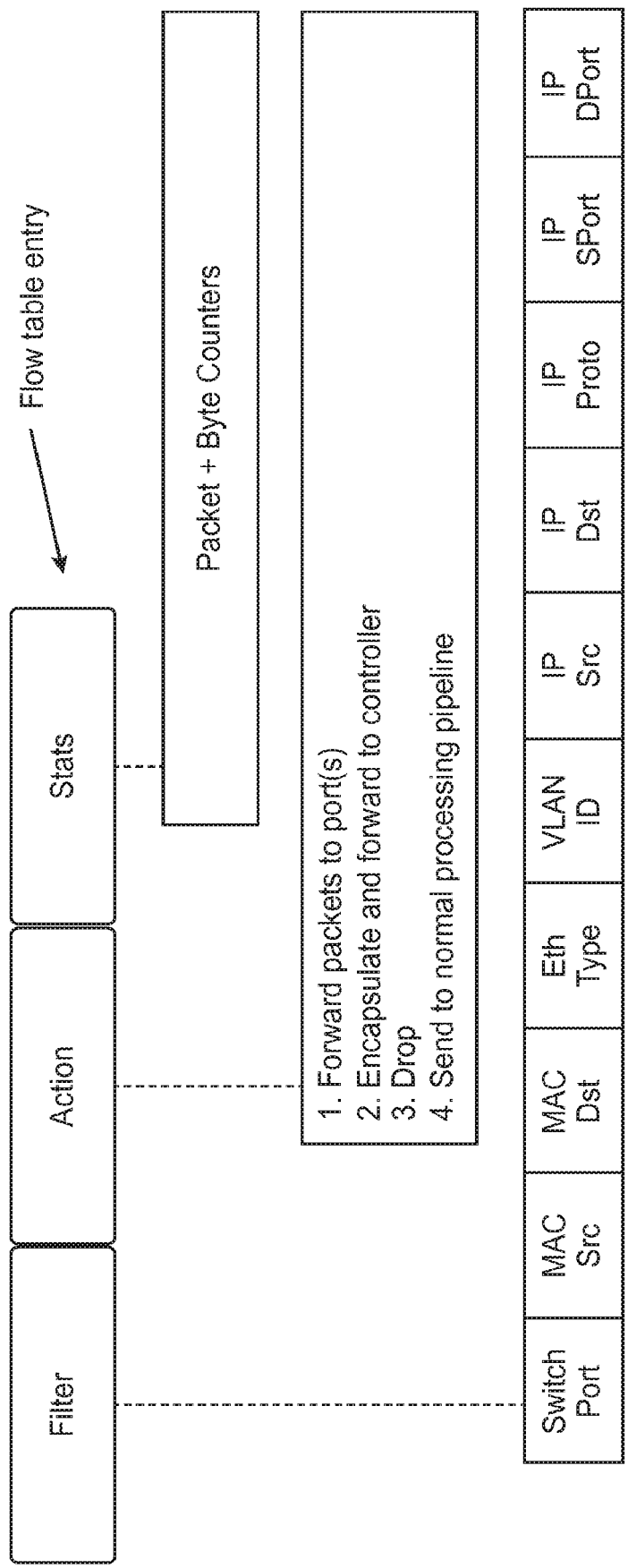
FIG. 11B illustrates an example of a flow table entry.

FIG. 11B illustrates an example of a flow table entry that may be used to implement one or more filters at a service node. As shown in the figure, the flow table entry has three components: filter, action, and stats. The filter components include multiple fields for defining the filter. The action component includes one or more action to be performed by the service node if a packet matches a filter. By means of non-limiting examples, the action may be to forward packets, to encapsulate and forward packets, to drop packets, to send to normal processing pipeline, etc. The forwarding of packets may be to a controller (e.g., the fabric manager), to a service node, etc. Also, the flow table can have multiple flow table entries, and in some cases, the action may be to perform additional filtering by going to one or more other entries in the same flow table. The stats component generates statistics based on filter matches. In the illustrated example, the stats component includes one or more counters. In the illustrated embodiments, when the service node with the filter determines that there is a matched packet, the service node then forwards the matched packet (or at least a portion of it) to the fabric manager 100. The fabric manager 100 can then decide whether to modify an existing flow table entry on one or more service nodes, or to deploy new filters in one or more service nodes. If a new filter is deployed, the flow table at a service node will have one or more new flow table entries added therein to implement a new filter.

In some cases, the derivative filters may be organized in a table. In other cases, the derivative filters associated with the different service nodes may form a filter tree. The filter tree may be a topological representation of a subset of the auxiliary network covered by the user-defined filter. The filter tree may include a root node that is associated with the user-defined filter. Also, the filter tree may include a leaf node associated with an individual target being monitored. The tree nodes at each successive level of the tree offer finer grades of filtration.

As discussed, the derivative filter(s) generated by the filter generation module 1000 can be used to provide network statistics. Accordingly, one method of providing network statics may include generating network statistics based on a packet matching the one or more derivative filters, and storing the network statistics in association with the one or more derivative filters.

In some cases, the act of generating the network statistics may comprise updating a counter (i.e., the stats component in the flow table entry of FIG. 11B) in response to the packet matching one of the one or more derivative filters. For example, in some cases, the derivative filter(s) may include a first derivative filter and a second derivative filter, the first derivative filter corresponding with a first component in the network, and the second derivative filter corresponding with a second component in the network. In such cases, the act of generating the network statistics may include updating first statistical information for the first component in response to the packet matching the first derivative filter, and updating second statistical information for the second component in response to the packet matching the second derivative filter, as the packet traverses through the first and second components in the auxiliary network.

In some cases, the network statistics may provide varying levels of visibility into a network traffic pattern of the auxiliary network in relation to the user-defined filter. Also, in some cases, the network statistics may be organized in a tree data-structure. A user interface may be provided for allowing a user to select a level of visibility into a network traffic pattern in relation to the user-defined filter. For example, in some cases, the derivative filters may include a first derivative filter and a second derivative filter, the second derivative filter providing a finer grade of filtration compared to the first derivative filter. Also, the first derivative filter may be used to generate a first network statistics, and the second derivative filter may be used to generate a second network statistics. In such cases, the user interface may provide the first network statistics associated with the first derivative filter if the user selects a first level of visibility as the selected level of visibility, or may provide the second network statistics associated with the second derivative filter if the user selects a second level of visibility as the selected level of visibility. It should be noted that in other cases, there may be more than two derivative filters corresponding with different respective levels of visibility.

FIG. 12 illustrates an example of a filter tree that may be created using the above technique. As shown in the figure, the user has input high-level filter: "IP_src=172.26.0.0/16, IP_dst=Remote_Subnet" and "IP_src=Remote_Subnet, IP_src=172.26.0.0/16". Such user-defined filter may be input using the user-interface module 120 in the fabric manager 100. Since this is the high-lever filter, the filter generation module 1000 may create a filter tree with the user-defined filter being the root node of the filter tree.

The user-defined filter is then applied to the auxiliary network. As discussed, the auxiliary network includes multiple service nodes, e.g., P0, P1, P2 nodes, such as that described with reference to FIG. 1. The user-defined filter may be stored at a service node so that the service node can utilize the filter for packet matching. As the auxiliary network processes packets that arrive at different service nodes of the auxiliary network, if a packet matches the user-defined filter at a certain node, the controller 22 will detect this event, and will inform the fabric manager 100. In one implementation, a "forward action" may be associated with the filter and be implemented at the controller 22, so that when the packet matches the user-defined filter, the controller 22 will forward a message to the fabric manager 100. The fabric manager 100 then automatically creates one or more derivative filters for that service node where the matching packet is detected, and transmits the derivative filter(s) for future application by that service node. Alternatively, a service node may detect a matching of the packet against the user-defined filter. In such cases, the service node will forward a message to the controller/fabric manager 100, which then automatically creates the derivative filter(s).

For example, with reference to the example of FIG. 12, if the packet matching the user-defined filter (e.g., 172.26.0.0/16) arrives at a service node in the auxiliary network, then the controller 22 detects this event, and sends a corresponding message to the fabric manager 100. The fabric manager 100 then creates derivative filter(s) with a finer grade of filtration than the user-defined filter for that service node, and transmits the derivative filter(s) for application at the service node. Alternatively, a service node may detect the event, and send a corresponding message to the fabric manager 100 (which may or may not be a part of the controller 22), which then creates the derivative filter(s). In the example, the matched packet traversed a subnet "172.26.1.0/24", and so a derivative filter is automatically created for this subnet. Also, in the illustrated example, the matched packet reached a target with address "172.26.1.2", and so a second derivative filter is automatically created for this address. As the network continues to process additional packets, additional derivative filters will be automatically created to "grow" the filter tree over time.

It should be noted that the derivative filters are not limited to being created based on IP address (which was used as an example of the filter component), and that derivative filters may be created based on other parameters in other embodiments.

In some cases, the filter tree may be spread out across multiple fabric service nodes (e.g., P0 node(s), P1 node(s), P2 node(s), etc.), each instantiating a portion of it. Packets traversing down the filter tree hierarchy are forwarded from one service node to another using appropriate IP tunneling technology. The distributed filter tree is advantageous because it may be easily scalable. For example, large filter trees may be created that exceed the resource capacity of individual fabric service nodes. The distributed filter tree is also reliable because a failure of an individual fabric service node will not result in losing the entire filter tree.

The filter tree may be used to generate filter match statistics. As packets travel through different service nodes in the network, they percolate down the hierarchy of the filter tree (e.g., enter a filter tree at the root node and travel to a leaf node). As a packet visits each tree-node, the visit is recorded by updating the filter match statistics. Accordingly, as the network processes packets over time, the counters at the different respective tree-nodes of the filter tree will be updated. As a packet percolate down the hierarchy of the filter tree, it traverses the root node first, and may reach a finer-grade tree node at the next tree level. The packet may also traverse additional tree level(s) with increasing finer-grade of filtration. Thus, a packet going through the filter tree may cause one or more updates in one or more of the counters at one or more levels of the tree. The collection of filter match statistics in a filter tree provides a rich source of machine generated data that is organized to offer varying levels of visibility into the traffic patterns of the auxiliary network in relation to the user specified filter(s). The leaf nodes in the filter tree have information on the individual targets that are being monitored. Higher level nodes within the filter tree may contain aggregate information on various types of network organizational structures (e.g., VLANs, subnets, protocols, etc). The root node may provide a consolidated summary of the environment under study.

In the illustrated embodiments, the statistics generated at the different nodes may be stored in the respective nodes. In some cases, the counters providing the statistics that are associated with the filters reside alongside the filter. As filter matches happen, the service node with the filter will automatically update the associated counters for that filter. In some cases, the fabric manager 100 may periodically collect the values stored in the counters from one or more (e.g., all) of the filters that make up the filter tree. The collection of the values may be performed automatically by the fabric manager 100, or may be performed in response to a request by a user. The collected data may be stored in a non-transitory medium (e.g., database) associated with the fabric manager 100. In some cases, the fabric manager 100 may perform analysis using the collected data.

The tree structure described herein is advantageous because it is naturally suited for distribution, and is easily scalable because the tree can spread to multiple nodes. This allows for expansion of bandwidth capacity. Also, the filter tree allows comparison and analysis to be performed for certain interested group. For example, a user may specify a filter for the root node to monitor packets at only HR subnet, etc. In such example, a filter tree would be created for this specified interested group.

As illustrated above, the IFTA engine is advantageous because it allows the visibility fabric itself to generate statistics and network information that may be useful in providing visibility of network traffic patterns for a network. Such may be accomplished even without the use of the tools 20 because the visibility fabric itself is used to generate the statistics and network information. Also, because the visibility fabric is logically located closer to the targets being monitored as compared to the tools 20, the IFTA engine is able to provide valuable network information while consuming less network resources (e.g., compared to the technique in which packets need to go through the visibility fabric to reach the tools, and be analyzed by the tools before the network information can be obtained).

It should be noted that one or more features and/or functions described herein with respect to the fabric manager may be implemented in one or more service nodes in the auxiliary network.

Figure 13B:
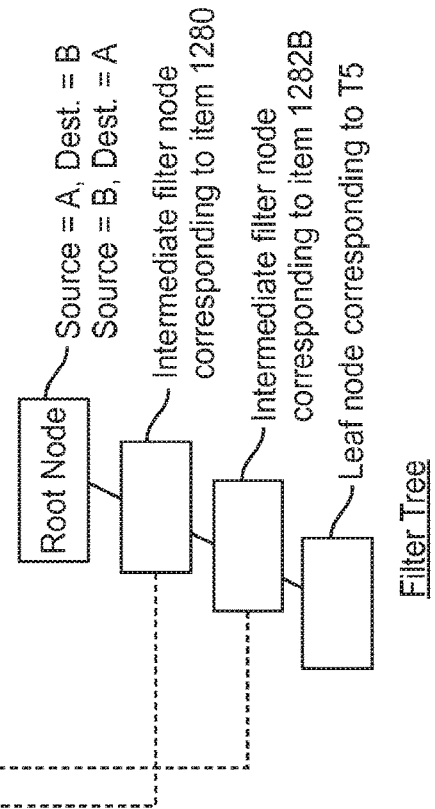
FIG. 13A-13B illustrate an example of a filter tree formation.
Figure 13A:
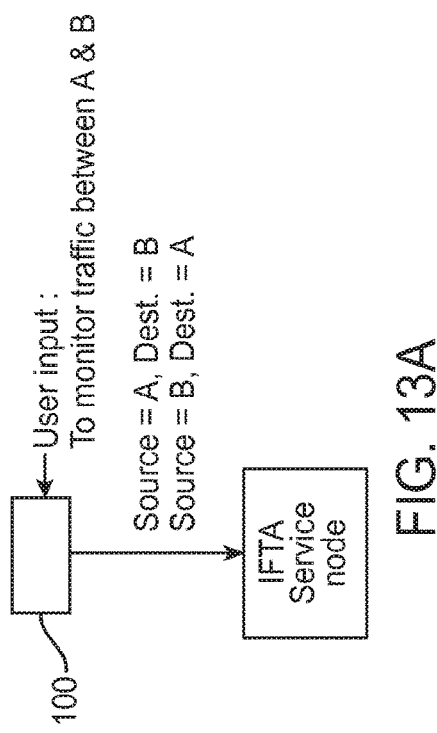

As discussed, the derivative filters may be stored at a service node, or alternatively be distributed in multiple service nodes. FIG. 13A illustrates the creation of the filters and how they correspond with a filter tree. First the fabric manager 100 receives an input from a user regarding targets that are desired to be monitored. For example, the user input may indicate that network traffics communicated between A and B are to be monitored. Accordingly, a root filter corresponding to a root node in the filter tree is created. The root filter may be:

Source=A, Destination=B
Source=B, Destination=A so that bidirectional traffic is captured. The root filter may be stored in a IFTA service node. When a packet arrives at the service node that matches the root filter, the matching information is communicated to the fabric manager. The fabric manager then creates one or more derivative filters based on the matched packet, and sends the filter(s) to the IFTA service node at which the matched packet was detected. In some cases, the implementation of the filter(s) at the IFTA may be accomplished by creating and/or modifying an entry in the flow table in the IFTA service node, as similarly discussed.

It should be noted that the matched packet contains all of the information required to create the additional nodes in the tree. Accordingly, the first time the packet matches the user-specified high-level filter, all of the tree nodes that correspond with the matched packet can be created. For example, as shown in FIG. 13B, assuming the matched packet comes from one of the targets (T5) in a network 1280 that includes sub-networks 1282A, 1282B, in which targets T1-T3 belong to sub-networks 1282A, and targets T4-T6 belong to sub-networks 1282B. In this example, when the matched packet corresponding to target T5 is detected at the IFTA service node, the system will know that the packet traverses through network 1280, through the sub-network 1282B, to reach the target T5. Accordingly, in addition to creating a leave node representing the target T5, the system can also create a node representing the sub-network 1282B, and another node representing the network 1280.

As discussed, the created derivative filters are stored in the IFTA node where the matched packet is detected. The created derivative filters represent the network components through which the matched packet traversed. In other cases, the created derivative filters may be spread across multiple IFTA nodes. For example, following the above example of FIG. 13B, a first IFTA node may have a first derivative filter capturing packets for targets T1-T3 under sub-network 1282A, and a second IFTA node may have a second derivative filter capturing packets for targets T4-T6 under sub-network 1282B. The first and second IFTA nodes are communicatively chained together such that they collectively captured all of the relevant packets. Accordingly, the set of filters may be broken down/divided into the relevant service nodes that correspond with the targets.

Figure 13C:
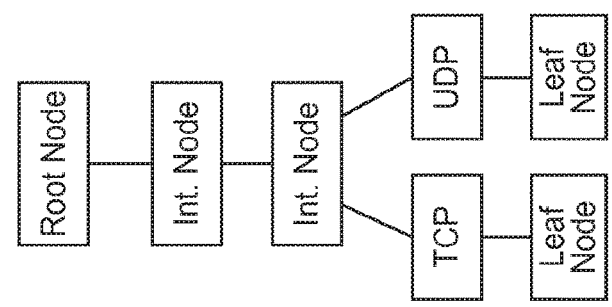
FIG. 13C illustrates another example of a filter tree.

It should be noted that the manner in which the set of filters are broken down/divided is not limited to the example discussed above, and that there are many other ways to spread the filters among multiple IFTA service nodes. For example, in other embodiments, one IFTA nodes may have a filter that corresponds with the sub-network 1282B, and another IFTA nodes may have filters that correspond with all the targets T4-T6 under the sub-network 1282B. As another example, the filter may further be broken down according to any user-defined parameter(s). For example, in other embodiments, there may be a filter associated for one of the targets, e.g., target T1, for filtering packets under TCP protocol, and another filter for filtering packets under UDP protocol (FIG. 13C).

Specialized Processing System Architecture

Figure 14:
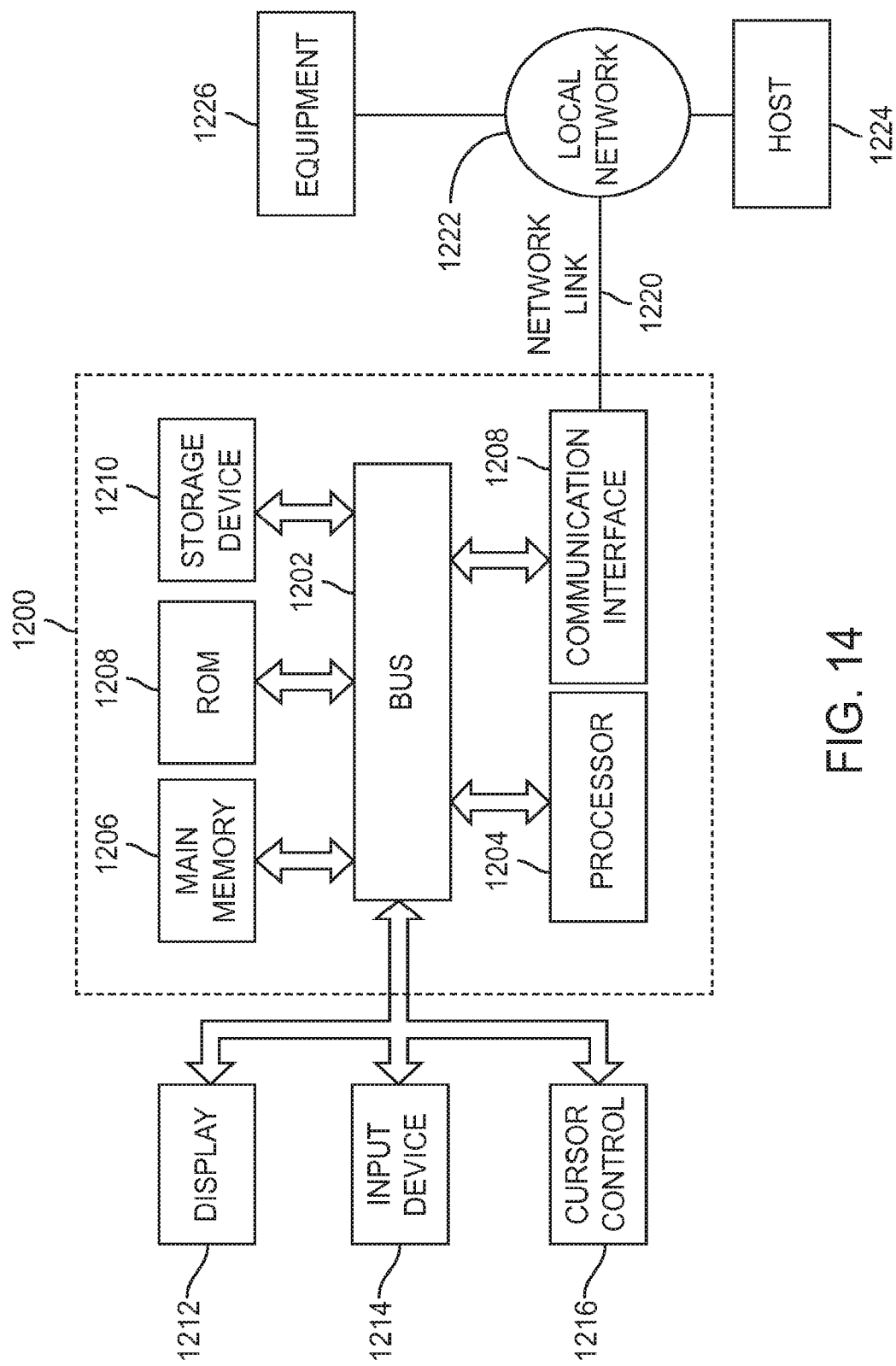
FIG. 14 illustrates a specialized computer system with which embodiments described herein may be implemented.

FIG. 14 is a block diagram that illustrates an embodiment of a specialized processing system 1200 upon which embodiments described herein may be implemented. For example, in some embodiments, the specialized processing system 1200 may be used to implement one or more functions of the processing unit 102, or one or more functions of the fabric manager 100 described herein. The processing system 1200 includes a bus 1202 or other communication mechanism for communicating information, and a processor 1204 coupled with the bus 1202 for processing information. The processor 1204 may be used to perform various functions described herein. For examples, the processor 1204 may be a specialized processor having a network creation module, a target selection module, a filter creation module, or any combination of the foregoing. Accordingly, the processor 1204 may be a network creation processing unit, a target selection processing unit, a filter creation processing unit, or any combination of the foregoing.

The processing system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The processing system 1200 may be used for performing various functions in accordance with the embodiments described herein. According to one embodiment, such use is provided by processing system 1200 in response to processor 1204 executing one or more sequences of one or more instructions contained in the main memory 1206. Such instructions may be read into the main memory 1206 from another processor-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "processor-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processing system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processing system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the processing system 1200, are exemplary forms of carrier waves transporting the information. The processing system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A filter generation method for a network, comprising:
receiving an indication that a first packet matches a user-defined filter, the user-defined over the network filter being implemented as executable logic that sorts packets according to a criterion identified by a user and using a first granularity of filtration, wherein the network comprises an auxiliary network configured to obtain the packets from a traffic production network;
creating one or more derivative filters in response to receipt of the indication that the first packet matches the user-defined filter, by using an automatic filter generation module, wherein the one or more derivative filters are dynamically created by the automatic filter generation module based at least in part on the received indication, wherein the one or more derivative filters are topologically positioned at nodes, wherein packets from the user-defined filter are directed to lower layers of derivative filters based on how the packets match filtration at higher layers at a prior filter;

forwarding or dropping, by a first derivative filter implemented as executable logic, packets including the first packet to the network according to the criterion identified by the user and using a second granularity of filtration, wherein the second granularity of filtration is finer than the first granularity of filtration, and wherein the first derivative filter is one of said one or more derivative filters; and storing the one or more derivative filters in a non-transitory medium to provide network traffic analysis.

2. The method of claim 1, further comprising:

filtering, by a second derivative filter implemented as executable logic, packets according to a third granularity of filtration, the third granularity of filtration is finer than the second granularity of filtration, wherein the second derivative filter is one of the one or more derivative filters.

3. The method of claim 1, wherein implementation of the one or more derivative filters comprise direction by a flow table entry, wherein the direction includes filtration, network action, and statistics generation.

4. The method of claim 1, wherein the one or more derivative filters are implemented in a tree structure and the one or more derivative filters are topologically positioned at nodes of the tree structure, wherein packets are directed to lower layers of derivative filters based on how the packets match filtration of higher layers of derivative filters.

5. The method of claim 4, wherein the tree structure comprises a topological representation of a subset of the network covered by the user-defined filter.

6. The method of claim 4, wherein the tree structure comprises a root node that is associated with the user-defined filter.

7. The method of claim 4, wherein the tree structure comprises a leaf node associated with an individual target being monitored.

8. The method of claim 1, further comprising deploying the one or more derivative filters to one or more service nodes.

9. The method of claim 1, wherein the automatic filter generation module is integrated with a SDN controller.

10. The method of claim 1, wherein said forwarding by the first derivative filter comprises any of:

forward the packet to a specified network location;
encapsulate the packet and forward to a controller; or
send the packet to an unfiltered processing pipeline.

11. The method of claim 1, wherein the indication comprises a truncated packet that is truncated from the packet matching the user-defined filter; and wherein the first derivative filter is dynamically created by the automatic filter generation module based on the truncated packet.

12. The method of claim 1, further comprising:

generating network statistics based on the packet matching the one or more derivative filters; and
storing the network statistics in association with the one or more derivative filters.

13. The method of claim 12, wherein the act of generating the network statistics comprises updating a counter in response to the packet matching one of the one or more derivative filters.

14. The method of claim 12, wherein the one or more derivative filters further comprise a second derivative filter, the first derivative filter corresponding with a first component in the network, and the second derivative filter corresponding with a second component in the network; and wherein the act of generating the network statistics comprises updating first statistical information for the first component in response to the packet matching the first derivative filter and updating second statistical information for the second component in response to the packet matching the second derivative filter, as the packet traverses through the first and second components in the network.

15. The method of claim 12, wherein the network statistics provide varying levels of visibility into a network traffic pattern associated with the user-defined filter.

16. The method of claim 12, further comprising providing a user interface for enabling a user to select a level of visibility into a network traffic pattern in relation to the user-defined filter.

17. The method of claim 16, wherein the one or more derivative filters comprise a second derivative filter, the second derivative filter includes a third granularity of filtration that is finer than the second granularity of filtration;

wherein the network statistics comprise a first network statistics and a second network statistics;
wherein the method further comprises providing the first network statistics associated with the first derivative filter if the user selects a first level of visibility as the selected level of visibility or providing the second network statistics associated with the second derivative filter if the user selects a second level of visibility as the selected level of visibility.

18. A system for a network, comprising:

a processing unit that has a filter generation module configured for:
receiving an indication over the network a first time that a first packet matches a user-defined filter implemented as executable logic configured to sort packets according to a criterion identified by a user and using a first granularity of filtration, wherein the network comprises an auxiliary network configured to obtain the packets from a traffic production network; and
creating one or more derivative filters in response to the received indication that the first packet matches the user-defined filter, wherein the one or more derivative filters are topologically positioned at nodes, wherein packets from the user-defined filter are directed to lower layers of derivative filters based on how the packets match filtration at higher layers at a prior filter, wherein a first derivative filter implemented as executable logic and causes the processing unit to forward or drop packets including the first packet according to the criterion identified by the user and using a second granularity of filtration that is finer than the first granularity of filtration, wherein the first derivative filter is one of the one or more derivative filters; and
a non-transitory medium configured to store the one or more derivative filters to provide network traffic analysis.

19. The system of claim 18, wherein a second derivative filter implemented as executable logic causes the processing unit to sort packets according to a third granularity of filtration that is finer than the second granularity of filtration, wherein the second derivative filter is one of the one or more derivative filters.

20. The system of claim 18, wherein implementation of the one or more derivative filters comprise direction by a flow table entry, wherein the direction includes filtration, network action, and statistics generation.

21. The system of claim 18, wherein the one or more derivative filters are implemented in a tree structure and the one or more derivative filters are topologically positioned at nodes of the tree structure, wherein packets are delivered to lower layers of derivative filters based on how the packets match filtration of higher layers of derivative filters.

22. The system of claim 21, wherein the tree structure comprises a topological representation of a subset of the network covered by the user-defined filter.

23. The system of claim 21, wherein the tree structure comprises a root node that is associated with the user-defined filter.

24. The system of claim 21, wherein the tree structure comprises a leaf node associated with an individual target being monitored.

25. The system of claim 18, further comprising:
an output port configured to output the one or more derivative filters for deployment to one or more service nodes.

26. The system of claim 18, wherein the processing unit is integrated with a SDN controller.

27. The system of claim 18, wherein the processing unit is further configured to receive a truncated packet as the indication, the truncated packet being truncated from the packet matching the user-defined filter;
wherein the filter generation module is configured to dynamically create the first derivative filter based on the truncated packet.

28. The system of claim 18, further comprising:
a database for storing network statistics in association with the one or more derivative filters, wherein the network statistics are based on the packet matching the one or more derivative filters.

29. The system of claim 28, wherein the database comprises a counter that is updated in response to the packet matching one of the one or more derivative filters.

30. The system of claim 28, wherein the one or more derivative filters further comprise a second derivative filter, the first derivative filter corresponding with a first component in the network, and the second derivative filter corresponding with a second component in the network; and
wherein the database is configured to update first statistical information for the first component in response to the packet matching the first derivative filter, and to update second statistical information for the second component in response to the packet matching the second derivative filter, as the packet traverses through the first and second components in the network.

31. The system of claim 28, wherein the network statistics provide varying levels of visibility into a network traffic pattern associated with the user-defined filter.

32. The system of claim 28, further comprising:
a user interface configured for enabling a user to select a level of visibility into a network traffic pattern in relation to the user-defined filter.

33. The system of claim 32, wherein the one or more derivative filters comprise a second derivative filter, the second derivative filter includes a third granularity of filtration that is finer than the second granularity of filtration;
wherein the network statistics comprise a first network statistics and a second network statistics;
wherein the user interface is configured to provide the first network statistics associated with the first derivative filter if the user selects a first level of visibility as the selected level of visibility, or to provide the second network statistics associated with the second derivative filter if the user selects a second level of visibility as the selected level of visibility.

34. A method comprising:
receiving an indication that a packet transiting a network matches a first rule, wherein implementation of the first rule forwards or drops packets in the network according to a first level of restriction, wherein the network comprises an auxiliary network configured to obtain the packets from a traffic production network; and
responsive to said receiving said indication, automatically creating a second rule, the second rule being based on the first rule and configured to cause a processor to further forward or drop packets based on the first rule, the second rule configured to cause packets to be forwarded or dropped in the network according to a second level of restriction that is finer than the first level of restriction, wherein the second rule is topologically positioned as a node, wherein packets matching the first rule are directed to a lower rule layer, including the second rule based on how the packets match filtration at higher layers at a prior rule, including the first rule.

35. The method of claim 34, further comprising:
responsive to said receiving said indication, automatically creating a third rule, the third rule is based on the first rule and causes a processor to further sort packets after filtering by the first rule, the third rule causes packets to be sorted in the network according to a third level of restriction that is narrower than the first level of restriction; and
directing subsequent packets according to a rule tree, wherein packets matching the first rule are further sorted according to the second rule and packets that do not match the first rule are further sorted according to the third rule.

36. The method of claim 34, wherein said forward or drop of packets comprises any of:
forward the packet to a specified network location;
encapsulate the packet and forward to a controller;
drop the packet; or
send the packet to an unfiltered processing pipeline.

37. The method of claim 34, wherein implementation of the second rule comprises direction by a flow table entry, wherein the direction includes filtration, network action, and statistics generation.

38. The method of claim 34, further comprising:
responsive to said receiving said indication, automatically creating a third rule, the third rule is based on the first rule and causes a processor to further sort packets after filtering by the first rule, the third rule causes packets to be sorted in the network according to a third level of restriction that is narrower than the second level of restriction.

* * * * *